United States Patent [19]

Morikawa et al.

[11] Patent Number: 5,453,852
[45] Date of Patent: Sep. 26, 1995

[54] PAPER FEED ROLLER STRUCTURE FOR IMAGE READING APPARATUS

[75] Inventors: Shuichi Morikawa, Kanazawa; Masahiko Futatsuka, Ishikawa; Satoshi Ishida; Yasunori Miyauchi, both of Kanazawa; Minoru Masuda, Ishikawa; Makoto Takagawa, Kanazawa, all of Japan

[73] Assignees: PFU Limited, Unoke; Fujitsu Limited, Kawasaki, both of Japan

[21] Appl. No.: 140,161

[22] PCT Filed: Mar. 19, 1993

[86] PCT No.: PCT/JP93/00329

§ 371 Date: Mar. 7, 1994

§ 102(e) Date: Mar. 7, 1994

[87] PCT Pub. No.: WO93/18993

PCT Pub. Date: Sep. 30, 1993

[30] Foreign Application Priority Data

| Mar. 19, 1992 | [JP] | Japan | 4-093746 |
| Apr. 20, 1992 | [JP] | Japan | 4-128049 |
| Apr. 20, 1992 | [JP] | Japan | 4-128051 |
| Nov. 19, 1992 | [JP] | Japan | 4-335574 |

[51] Int. Cl.$^6$ .......................... H04N 1/00; B65H 3/52
[52] U.S. Cl. .......................... 358/498; 271/121; 271/124; 271/137; 271/138
[58] Field of Search .......................... 358/498, 496; 355/308; 271/121, 124, 138, 137

[56] References Cited

U.S. PATENT DOCUMENTS

| 3,578,178 | 5/1971 | Absler . | |
| 3,986,712 | 10/1976 | Hasegawa . | |
| 4,383,275 | 5/1983 | Sasaki . | |
| 4,411,517 | 10/1983 | Gerken | 355/308 |
| 4,412,740 | 10/1983 | Gerken | 355/308 |
| 4,443,006 | 4/1984 | Hasegawa . | |
| 4,575,068 | 3/1986 | Kato . | |
| 4,605,217 | 8/1986 | Goi | 271/124 |
| 4,717,137 | 1/1988 | Leuthold | 271/124 |
| 4,754,337 | 6/1988 | Nohtomi . | |
| 4,907,097 | 3/1990 | Sobue . | |

FOREIGN PATENT DOCUMENTS

| 2401530 | 7/1975 | Germany . |
| 2041530 | 7/1975 | Germany . |
| 58-40971 | 3/1983 | Japan . |
| 58-79370 | 5/1983 | Japan . |
| 60-13934 | 4/1985 | Japan . |
| 61-163257 | 10/1986 | Japan . |
| 61-282232 | 12/1986 | Japan . |
| 61-277248 | 12/1986 | Japan . |
| 61-203652 | 12/1986 | Japan . |
| 62-8374 | 2/1987 | Japan . |
| 62-79130 | 4/1987 | Japan . |
| 62-272658 | 11/1987 | Japan . |
| 63-32844 | 3/1988 | Japan . |
| 63-242837 | 10/1988 | Japan . |
| 1-26870 | 5/1989 | Japan . |
| 1-51414 | 11/1989 | Japan . |
| 3-18437 | 4/1991 | Japan . |
| 5-24702 | 2/1993 | Japan . |
| 2057404 | 4/1981 | United Kingdom . |
| 2057404A | 4/1981 | United Kingdom . |
| 2128438 | 4/1984 | United Kingdom . |
| 2141109 | 12/1984 | United Kingdom . |
| 2240584 | 8/1991 | United Kingdom . |
| WO90/04900 | 5/1990 | WIPO . |

*Primary Examiner*—Scott A. Rogers
*Attorney, Agent, or Firm*—Nikaido, Marmelstein, Murray & Oram

[57] ABSTRACT

A paper feed roller (5) is divided into a first roller (5a) and a second roller (5b); a slit (58) through which about 10 to 20 sheets of documents can pass is formed between the first roller and a gate plate (57) opposite to this; and the paper fed out therefrom is fed out to a space between the second roller (5b) and a separation pad (7) in contact with this.

Also, there is adopted a construction in which the pressing force of a paper conveyance spring is transformed by a slide cam sliding in a direction parallel to the paper feed roller; and the paper width detection sensor is assembled by a fitting construction.

7 Claims, 25 Drawing Sheets

Feed direction

PAPER FEED ROLLER STRUCTURE FOR IMAGE READING APPARATUS

TECHNICAL FIELD

The present invention relates to an image reading apparatus such as a facsimile or image scanner and is further directed to the improvement of the components of such an image reading apparatus.

BACKGROUND ART

A brief explanation will be made first, referring to FIG. 41, of the general configuration of an image reading apparatus (including both the one-side and two-side reading types) in which media having information to be read (below, referred to as documents or paper) are stacked on a hopper and are sequentially taken out from the lowermost document (bottom take-out type) and the information of the document is optically read (two-side reading type).

In the figure, the documents 1 stacked on a document hopper 3 are sequentially taken out from the lowermost document by the coaction of a paper feed roller 5 and a document separation pad elastically pressed against the same. Thereafter, the documents 1 are sent to a paper eject roller 13 via feed rollers 9 and 11 while being guided by paper guides (document stands) 17 and 19 and are ejected from there to the outside and stacked on a stacker 15. During this feeding operation, the information of the document is read by a first optical reading unit 21A and a second optical reading unit 21B. In the illustrated conventional example, the first optical reading unit 21A is arranged beneath a document passage 23 and reads the information (image) on a lower surface of the document, while the second optical reading unit 21B is arranged above the document passage 23 and reads the information (image) on the upper surface of the document. Note that, the first optical reading unit 21A and second optical reading unit 21B are constituted by light source lamps 25a and 25b; first and second reflection mirrors 27a, 29a and 27b, 29b; imaging lenses 31a and 31b; and one-directional image sensors 33a and 33b.

FIG. 42 shows the general configuration of a single reading unit type image reading apparatus which reads both surfaces of the document by inverting the same.

In the figure, parts corresponding to those in FIG. 41 are given the same numerals, and an explanation thereof will be omitted. Note that, in FIG. 42, the document 1 is shown supplied from the left side of the figure reverse to FIG. 41. The document 1 is sent in the right direction in the figure by a feed belt 41, and initially the image of the lower surface is read by the single reading unit 21. Note that, the reading unit 21 is moveable along the document stand 17, which performs a sub-scanning (in a direction orthogonal to a beam scanning direction, that is, the scanning of the document feeding direction). This sub-scanning is exactly the same in the case of FIG. 41 as well.

The document whose lower surface has been read is drawn in a direction A of the figure (left direction) by the feed belt 41. Before the rear edge is separated from reversing rollers 43, the feed belt 41 is reversed to pass the document between the reversing rollers 43, draw it in a direction B, and drop it on the reversing stand 45. Thereafter, the reversing rollers 43 are reversed and the document 1 is supplied onto the document stand 17 by coaction with the feed belt 41. At this time, the front and back of the document 1 are inverted from those at the first reading, and accordingly the image of the other surface (initial upper surface) can be read. After the completion of the reading operation, the feed belt 41 is reversed again, and the document 1 is fed rightward in the figure and stacked on the stacker 15. Note that, at this time, the passage switching lever 47 is opened to a position 47'. Although not particularly illustrated, if necessary, the passage switching lever is appropriately provided also at the portion of the reversing rollers 43.

There has been a rapid reduction of size and lowering of price of the main body of data processing apparatuses. Along with this, the reduction of size and lowering of price of the peripherals have been demanded. The image reading apparatuses are no exceptions. There was a problem in that with the conventional construction of image reading apparatuses, it was not possible to sufficiently respond to such demands for reduction of size and lowering of price, that is, the greater density of the mechanical components constituting the image reading apparatus and greater ease of fabrication and assembly of the same.

A bottom take-out type automatic paper feeding apparatus is provided, as shown in FIG. 43, with a paper feed roller 5 which comes into contact with the lower surface of a front edge portion of the document 1 stacked on the hopper 3 on the paper feeding side of the hopper 3. The conventional bottom take-out type automatic paper feeding apparatus is constructed so that this paper feed roller 5 is constituted by one roller and so that the front edge of the separation pad 7B, which is provided with flexibility, comes into surface-contact with the circumferential surface of the paper feed roller 5, so that the separated lowermost paper 1 is changed in its orientation slightly downward and fed out from a space between the paper feed roller 5 and the separation pad 7B.

The document fed out in this way is further fed while being held between a drive roller 9a and a driven roller 9b of the feed rollers 9. When it passes the reading portion a, an image of the image information on the paper is formed on a light receiving cells of the CCD's 33a and 33b by lenses 31a (31b) and read. The document is then ejected to the stacker 15 (FIG. 41) on the left side in that figure while being held between a drive roller 13a and a driven roller 13b of the eject rollers 13. In the conventional image reading apparatus provided with this type of construction, the feed rollers 9 and 11 (FIG. 41) and eject rollers 13 are synchronously driven by a feed motor 51, and the feed roller 5 is driven to rotate in the same direction (the same direction in a sense that when the feed roller 9 rotates in a direction supplying the paper, the paper feed roller 5 rotates in the direction supplying the paper as well. The reverse is referred to as the "reverse direction". The same is true also below) as the feed rollers 9 via two transmission gears 53 and 55. The apparatus further is constructed so that, by raising the peripheral speed of the feed rollers 9 to be slightly higher than the peripheral speed of the paper feed roller 5, the feeding speed of the paper after the paper is grasped by the feed rollers 9 is defined by the feed rollers 9. At this time, there is no looseness of the paper or the like between the feed rollers 9 and the paper feed roller 5.

The reason why the bottom take-out type automatic paper feed apparatus is used as an image reading apparatus is that the apparatus is constituted so as to read the lower surface of the document. In the conventional bottom take-out type automatic paper feed apparatus as shown in FIG. 43, however, if the amount of the paper which is stacked is increased or the paper is thick paper, there was a problem that errors such as double feed, paper misfeeding, or the like were liable to occur, so the paper feeding performance was unstable in comparison with the top take-out type automatic paper feeding apparatus. Namely, if the amount of the stacked papers is increased, due to the weight of the paper, the frictional force between the paper and the paper feed roller 5 and between the sheets of paper is increased, so that double feeding becomes easy, while if the paper is a thick paper, the passing resistance when the paper passes between the paper feed roller 5 and separation pad 7B becomes large, so that paper misfeeding easily occurs. Also, in the conventional apparatus of this type of construction, to stabilize the feeding of the paper, it was necessary to set the paper on the document stand in an inclined state so that the front edge of the paper at the lower end projects out in the paper feeding direction to a greater extent at the setting of the paper, and there arose a problem that the work load of the operator became greater.

Further, in the conventional apparatus, the paper feed roller and feed rollers are rotated in the same direction, and the paper is separated by the difference in the peripheral speed between the paper feed roller 5 and feed rollers 9, therefore a skew at the time of the setting of the paper (skew feeding of the paper) appeared on the reading image as it was. When the paper feed roller was rotated fast so as to improve the through-put, double feed was apt to occur, and therefore there arose another problem in that the improvement of the through-put was restricted.

For example, in the bottom take-out type automatic paper feeding unit mentioned above, to cope with documents having a wide range of paper quality, it was necessary to push the documents against the paper feed roller 5 and make the biasing force of the conveyance spring 7A for separating the paper variable. In the conventional apparatus, a variable mechanism of this conveyance spring having a construction as shown in FIGS. 44 and 45 has been used. Namely, there has been adopted a construction in which a fixed spring 7a and a moveable spring 7b are provided as the conveyance spring, the moveable spring 7b is provided around a pivot shaft 61 in parallel to the paper feed roller 5 so that it can swing and is biased by a biasing projection 63 in a direction to move it away from the paper feed roller 5. On the other hand, a rectangular cam 67 which is pivotally provided on a seat plate 65 of the fixed spring 7a in an eccentric position is made to abut against an engagement piece 69 formed by bending the moveable spring 7b. The rectangular cam 67 is pivoted by the lever 71, whereby the engagement piece 69 is pushed by the rectangular cam 67 in a counterclockwise direction in FIG. 44, to elastically press the moveable spring 7b against the paper feed roller 5.

According to this conventional construction, the moveable spring 7b is made to abut against the paper feed roller 5 and is separated therefrom by the operation of the lever 71, whereby it is possible to change the paper separation ability of the automatic paper feeding apparatus, but the lever 71 is projected from the rectangular cam 67, and therefore there arisen a problem in that the apparatus can not be constituted in compact size, and the number of parts is large, and thus the apparatus construction has become complex.

Also, in an image reading apparatus, a paper width detection sensor for detecting the width dimension of the fed paper is provided, but the reflectance of the surface greatly changes for each document, and therefore it is difficult to directly detect the document by an optical sensor. Thus, a sensor provided with a lever which physically comes into contact with the paper and swings is provided inside the paper passage. This type of conventional sensor is constructed, as shown in FIG. 46, so that a sensor bracket 81 is fixed on a paper feed frame by a screw 83, and a sensor arm 91 provided with a shielding plate 87 and a detection lever 89 on its two ends is pivotally fixed on a collar 85 secured to this sensor bracket by the screw. When the paper strikes the detection lever 89 from a direction indicated by an arrow X in the figure, the sensor arm 91 swings in the counterclockwise direction in the figure and the shielding plate 87 retracts from the light path of an opto-electric sensor 93 (the shielding plate 87 is usually positioned inside the light path of the opto-electric sensor 93 and cuts the beam), to detect the paper. Such a construction, however, had the drawback that the assembly of the sensor was cumbersome.

Also, the light source lamps 25 (25a, 25b) of the reading units 21 (21A, 21B) (FIG. 41) must be replaced when amount of the light is lowered, but the conventional attachment structure for enabling that replacement was one in which, for example as shown in FIG. 47, a lamp unit 97 constituted by the light source lamp 25 and its lamp frame 95 was inserted or detached into or from the side of the apparatus in a longitudinal direction of the lamp to attach or detach the same. Here, in FIG. 47, 92 is a socket which is fixed on the lamp frame 95 and supports the two ends of the lamp 25, and 99 is a plate spring attached to the main body. This plate spring 99 has a function of elastically pressing the inserted lamp frame 95 to affix the same. Reference numeral 17 is a transparent document stand, and 27a is a first reflection mirror. In the case of such a construction, however, it is necessary to provide an opening for performing the attachment and detachment of the lamp unit 97 to the side of the reading unit and the side of the apparatus frame, and it is necessary to reinforce the frame to make up for the strength lost by this opening, and therefore there is a problem in that the frame construction becomes complex. Since the lamp unit 97 was moved in the longitudinal direction, there existed a problem in the space required for the replacement work and the workability.

An object of the present invention is to solve the problems as described above. The invention has as its gist to make improvements in a bottom take-out type automatic paper feeding apparatus so as to more correctly perform the separation and supply of the paper, to increase the amount of the paper able to be stacked on the document stand, to smoothly perform also the supply of thick paper documents, and to enable the correction of the skew.

Further, so as to solve the above-mentioned problems, the present invention has as its gist to obtain a technical means with which the paper feeding portion and reading portion can be constituted in a compact size, the fabrication and assembly of the constituent materials are easy, and accordingly a document reading apparatus greatly reduced in size in comparison with the conventional apparatus is provided at a lower cost.

DISCLOSURE OF THE INVENTION

According to the first aspect of the invention, there is adopted a construction in which the paper feed roller unit, which is conventionally comprised of one roller, is divided into a first roller and a second roller. The first roller is arranged at the front edge portion of the hopper so as to come into contact with the lower surface of the front edge portion of the stacked documents 1, and the second roller is arranged on the paper feeding side of the first roller. A separation pad which conducts the separation of the papers in association with the paper feed rollers is brought into contact with the second roller. On the other hand, the front edge of the gate plate is made to face the circumferential surface of the first roller. A slit through which about 10 to 20 sheets of paper can pass is formed between this front edge and the first roller. The paper fed out from this slit is fed to the contact portion between the second roller and the separation pad. The gate plate is arranged in a state of inclination with respect to the normal of the first roller so that its lower end side is inclined in the paper supplying direction.

The first roller and the second roller are driven in the same direction at an equal peripheral speed. When an automatic paper feeding apparatus having the above-described construction is provided in an image reading apparatus having feed rollers, the feed rollers and paper feed rollers are connected via one transmission gear and a one-directional clutch. When the feed rollers are reversed (rotated in the paper return direction), the paper feed rollers rotates forward (rotate in the paper feed-out direction). At the same time, when the feed rollers are rotated forward, the paper feed rollers are placed in a free rotation state by the release of connection of the aforesaid one-directional clutch.

The inclination angle of the aforesaid gate plate facing the first roller is preferably set to a large angle when the paper is a thick paper, while is set to a small angle when the paper is a thin paper. Accordingly, as a construction that can pivot around a support shaft parallel to the shaft of the first roller and can be affixed in place as well, it is effective if the gate plate can be changed in its inclination angle in accordance with the thickness or amount of the papers to be stacked.

To automatically perform the adjustment of the inclination angle of the gate plate in accordance with the thickness or amount of the paper, it is possible to adopt a construction in which a motor which can rotate in the forward and reverse directions and drive the gate plate to rotate around the support shaft is controlled by the detection signals of an empty sensor detecting the presence or absence of paper on the hopper and a first paper feed detection sensor detecting the paper between the first roller and the second roller. Namely, control is performed so that, when the empty switch detects the nonexistence of paper, the gate plate is restored to the set minimum inclination angle; when the first roller rotates forward in a state where the document 1 is stacked on the hopper, the feed out of the paper from the slit is monitored by the first paper feed detection sensor; if the first paper feed detection sensor does not detect paper even though a predetermined time has elapsed, a rotation instruction is given to the gate opening and closing motor so as to pivot the gate plate in a direction for inclination of the gate plate by exactly a predetermined angle; and when the first paper feed detection sensor still does not detect paper even though it has been on standby in this state for a predetermined time, a rotation instruction for further inclining the gate plate by exactly a predetermined angle is given to the gate opening and closing motor. This is repeatedly performed. When the first paper feed detection sensor detects the paper, control is performed so that the gate plate is retained at the angle at that time.

In an automatic paper feeding apparatus having the above-described construction, 10 to 20 sheets of paper are primarily separated and fed out from the slit by the first roller and the gate plate. The lowermost end sheet of paper is separated and fed out from these primarily separated papers by the second roller and separation pad. The amount of the paper to be primarily separated is substantially constant irrespective of whether the amount of paper on the document stand 2 is large or small, and accordingly the operation of separation of the paper by the second roller and the separation pad is carried out under almost the same conditions irrespective of whether the amount of the stacked papers is large or small, and therefore double feed due to an increase of the amount of stacking of paper can be avoided. Also, since the gate plate is inclined, the paper is more strongly pressed against the circumferential surface of the first roller by its wedging action, and the force of paper feeding by the first roller is increased. When the paper is a thick paper, due to the stiffness of the paper, the force of paper driving of this first roller is effectively transferred up to the front edge part of the paper striking the separation pad. As the paper becomes thicker, the feed out force of the paper when the front edge of the paper strikes the separation pad becomes stronger, and therefore paper misfeeding during the supply of thick paper can be prevented.

Further, when the inclination angle of the gate plate is made variable and the inclination angle thereof is increased when the paper is thick, the above-described function is exhibited more effectively. When control is adopted in which the inclination angle of the gate plate is increased until the first paper feed detection sensor arranged between the first roller and second roller detects the paper, when the paper is easily fed out, the inclination angle of the gate plate is retained as small, while when the paper is difficult to feed out, the inclination angle of the gate plate is increased in accordance with that level of difficulty to increase the contact force of the paper against the first roller by the wedging action thereof, so that the gate plate is automatically set at an angle at which a necessary and sufficient paper feeding force is generated. Note that, when the paper is replaced, the gate plate returns to the side at which the inclination angle becomes small, and the inclination angle of the gate plate is set according to the above-described procedures in accordance with the thickness of the newly stacked paper.

According to another aspect of the present invention, as the biasing force changing mechanism of the paper conveyance spring of the automatic paper feeding apparatus, a slide cam which slides in a direction parallel to the paper feed rollers is used. Namely, there is adopted a construction in which, on the seat plate on which the base end of the conveyance spring is affixed, a guide is provided parallel to the paper feed rollers, a cam piece abutting against the plate surface of the conveyance spring is provided on the slider slidably fitted on this guide, and the slider is moved along the guide, whereby the cam piece is made to abut against or separate from the surface of the spring, thereby making the biasing force of the conveyance spring variable.

Also, the paper width detection sensor of the image reading apparatus of this invention is constructed so as to be attached to the paper feed frame and sensor bracket by a simple construction of fitting in the sensor bracket and sensor arm. Namely, elastic projections provided with engagement claws at the front ends are formed on the attachment surface of the sensor bracket so as to project therefrom. Support bearings for supporting the sensor arm at the shaft are shaped provided with through holes with recesses having narrower widths than the diameters of the through holes. In the shaft support portion of the sensor arm, there is provided a pivot pin comprised of a cylinder having a diameter which enables fitting pivotably with the said through hole and having a parallel chamfered portion having a thickness that enables passing through the aforesaid recesses. The pivot pin is pivotally supported in the through-holes.

Also, as the construction for mounting the light source lamps, there is adopted a construction in which projection pieces provided at intervals in the longitudinal direction of the lamp frame are simply inserted into slit holes provided in the reading unit frame to secure the lamps thereto.

The biasing force switching mechanism of the conveyance spring in this invention changes the biasing force of the conveyance spring with respect to the paper feed rollers by inserting a cam piece at the surface of the conveyance spring from the side by sliding the slider and forcibly bending the conveyance spring by the cam piece. When the slider is slid to disengage the cam piece from the spring, the forced bending force by the cam piece is released, and therefore the biasing force of the conveyance spring returns to its original level. Accordingly, it is possible to change the biasing force of the conveyance spring by changing the sliding position of the slider. It is also possible to change the amount of projection of the cam piece stepwise along the sliding direction of the slider and thereby to change the biasing force of the conveyance spring in two or three or more stages.

The paper width detection sensor 12 in this invention is attached by rotating the sensor arm 14 a considerable amount in a predetermined direction around the sensor bracket 13 and in that state inserting the pivot pin 28 thereof into the through holes 21 through the recesses 22, then turning the sensor am in the reverse direction and fitting the projections of the sensor bracket in the engagement holes of the paper feed frame.

In the attached sensor, the sensor bracket is engaged with the paper feed frame by engagement by the claw pieces. The rocking angle of the sensor arm inside the sensor bracket is defined by the abutment of a stopper plate, which restricts the insertion of the shielding plate into the opto-electric sensor housing, and the detection lever against the paper feed frame. In this rocking range, the angle is never one where the parallel chamfered portion of the pivot pin is parallel to the recesses of the through holes, and therefore so long as the sensor bracket is not detached from the paper feed frame, the sensor arm will not detach from the sensor bracket. The sensor arm and the sensor bracket are attached to the sensor bracket and paper feed frame in a simple manner, therefore the assembly becomes easy, and also the number of parts becomes small.

Also, according to the attachment structure of the light source lamps of this invention, it is sufficient if projection pieces are formed in that lamp frame on the lamp unit, and it is sufficient if only small slit holes are provided in the reading unit frame. Therefore, the construction and the attachment and detachment are extremely easy, and also the problem of lowering of strength of the frame does not occur. In this way, in the above construction for attaching and detaching the light source lamps, the light source lamps cannot be attached or detached unless the members arranged above the light source lamps are removed, and therefore it may be considered that the attachment and detachment work would be cumbersome, but in practice, to enable clearing of jammed paper in the paper passage, there is adopted a construction in which the frame of the apparatus is divided to an upper frame and a lower frame, with the members above the document passage are attached to the upper frame and with the upper frame being pivotally supported by the lower frame. The document passage is opened by opening the upper frame, and so it is possible to easily insert or remove the light source lamps from above when the upper frame is opened.

Also, in the paper passage system of a two-side reading type image reading apparatus of this invention, a first guide roller and a second guide roller having white circumferential surfaces are arranged in parallel at the insertion side and feedout side of the document sandwiching the document reading position therebetween. A transparent guide forming a first arc passage and second arc passage and having a top angle smaller than 90 degrees is provided between the first and second guide rollers. The document reversing apparatus is arranged on a side opposite to the transparent guide between the two guide rollers.

Beneath the transparent guide, an imaging lens with a light axis parallel to the feeding direction of the document is arranged. Between this imaging lens and the aforesaid transparent guide, the first light source lamp and second light source lamp arranged so as to face the first guide roller and second guide roller, respectively; a first reflection surface facing the second guide roller side and a second reflection surface facing the first guide roller side; and a mutually opposite first sub-reflection surface and second sub-reflection surface are arranged, with the first elements and second elements being arranged on the two sides of the center plane of the transparent guide and imaging lens. The first image sensor and the second image sensor are arranged on the two sides below the imaging lens.

Also, in the paper passage system of the two-side reading type apparatus of this invention, a first reading light $L_1$ read at a first reading point $P_1$ on the first guide roller side is sequentially reflected at the first reflection surface, first sub-reflection surface, and the second sub-reflection surface, passed through the imaging lens, and focused on the first image sensor. A second reading light $L_2$ read at a second reading point $P_2$ on the second guide roller side is sequentially reflected at the second reflection surface, second sub-reflection surface, and first sub-reflection surface, passed through the imaging lens from a direction opposite to the first reading light $L_1$, and focused on the second image sensor. The surface of the document fed from the first arc passage into the reading portion is read at the first reading point $P_1$ while being fed by the guide rollers and not illustrated feed rollers and then is fed out to the reversing apparatus. After the document passes the first reading point $P_1$, the document is reversed by the reversing apparatus and guided to the second arc passage by the rotation of the second guide roller. Then, the back surface of the document is read at the second reading point $P_2$ while being fed by the second guide roller.

According to the construction of this invention, it is possible to arrange the first reading point $P_1$ and the second reading point $P_2$ close and, in addition, possible to contain two reading units in a space of the same extent as the conventional one reading unit by reflecting the reading lights $L_1$ and $L_2$ read at two reading points $P_1$ and $P_2$ so that they intersect each other. Thus, the apparatus can be constructed in a very small size. Moreover, it is sufficient even .if there is only one imaging lens. Also, the parts are symmetrically arranged, and therefore also the cost if the parts and the cost of assembly can be reduced.

Other objects, structures, functions, effects, etc. of the present invention will be more apparent from the following explanation of the embodiments with reference to the accompanying drawings.

BEST MODE FOR WORKING THE INVENTION

Note that, in the following explanation as well, parts corresponding to those in the prior art are indicated by the same numerals for clearer understanding, but this does not always mean that the structures are exactly the same.

Figure 1:
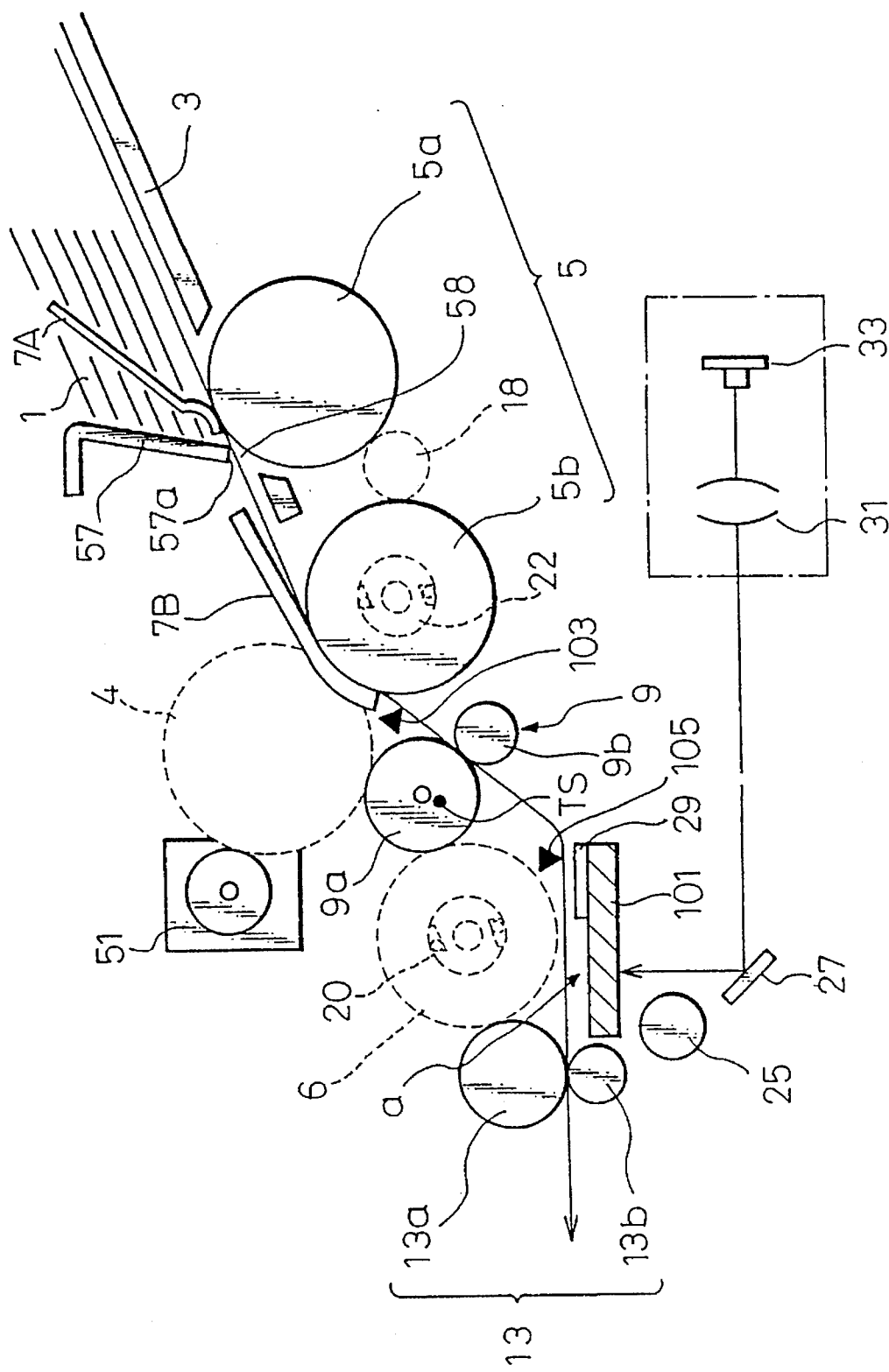
FIG. 1 is an illustrative side view showing one embodiment of an image reading apparatus of this invention.

FIG. 1 is a side view showing one embodiment in which an automatic paper feeding apparatus of this invention is attached to an image reading apparatus. A first roller 5a of the paper feed rollers 5 is arranged at the front edge portion of the hopper 3 on which the documents 1 to be read are stacked. A gate plate 57 is arranged at a part against which the front edge of the document 1 above this first roller 5a abuts. The gate plate 57 is provided with an inclination leftward with respect to the normal of the first roller 5a so that the position is made more eccentric to the feeding direction (leftward in the figure) as the gate plate 57 is at lower position of the document 1. Between that front end 57a and the circumferential surface of the first roller 5a, a slit 58 allowing the passing of 10 to 20 sheets of documents is formed. The gate plate 57 of FIG. 1 is of a fixed construction and is attached by being secured to the frame of the not illustrated apparatus etc.

A second roller 5b of the paper feed rollers 5 is arranged on the document feed-out side of the first roller 5a. The front edge portion of the sheet-like separation pad 7B, provided with flexibility, is in contact with the upper portion thereof in a manner curling around the same. The first roller 5a and the second roller 5b are synchronously driven by the transmission gear 18. A plurality of sheets of paper passed through the slit 58 are guided to the contact portion between the second roller 5b and the separation pad 7B by the frictional force of the first roller 5a. Only the lowermost sheet of paper is separated and fed out from the front end of the separation pad 7B.

On the extension of the front end of the separation pad 7B, the contact portion between a drive roller 9a and driven roller 9b of the feed rollers 9 is positioned. The paper 1 passing this contact portion changes in its direction when abutting against a horizontally provided platen glass 101 and is guided to the contact portion between a drive roller 13a and a driven roller 13b of the eject rollers 13. The reading portion "a" of the document is formed on the platen glass 101, and the image information of the document in the reading portion a illuminated by the light source lamp 25 is read by the light receiving cell of the CCD 33 through a reflection mirror 27 and an imaging lens 31. A white reference sheet 29 setting the reading level of the CCD 33 is adhered to the upstream side from "a" of the reading portion of the platen glass 101. The paper feed roller 5, feed roller 9, and the eject roller 13 are synchronously driven by a feed motor 51 via transfer gears 4 and 6 indicated by a broken line in the figure. The rotation of the feed motor 51 is transferred via the first transmission gear 4 to the drive roller 9a of the feed rollers, and that rotation is transferred via the second transmission gear 6 and the one-directional clutch 20 to the drive roller 13a of the eject rollers 13. This one-directional clutch is for preventing the rotation of the feed rollers 9 from being transferred to the eject rollers 13 when the feed rollers 9 rotate in reverse. When the drive roller 9a of the feed rollers rotates in the forward direction, that is, in the clockwise direction in FIG. 1, the related one-directional clutch 20 is connected and the eject rollers 13 rotate in the same direction, while when the feed rollers 9 rotate in reverse (in the counterclockwise direction of FIG. 1), the connection of the one-directional clutch is released, and the eject rollers 13 are kept in their stopped state.

The second roller 5b of the feed rollers 5 is connected to the first transmission gear 4 via the one-directional clutch 22. Due to the fact that the drive roller 9a of the feed rollers is in contact with the paper at the bottom part and the paper feed rollers 5 are in contact with the paper at the top part, the feed rollers 9 and the paper feed rollers 5 are driven in a reverse direction to each other in relationship with respect to that paper. The one-directional clutch 22 interposed between the first transmission gear 4 and the second roller 5b is connected when the feed roller 9 rotates in the reverse direction, that is, in a direction feeding back the paper, to rotate the paper feed roller 5 in a forward direction, that is, in a direction feeding out the paper. When the feed roller 9 rotates in the forward direction, the connection of the related clutch is released, and the paper feed roller 5 is kept in a free rotation state. The second paper feeding detection sensor 103 is attached between the second roller 5b and the feed roller 9 and a paper rear edge detection sensor 105 is attached to the position immediately upstream of the reading portion "a".

Note that the first and second clutches 22 and 24 are provided on the rotation shafts of for example the second transmission gear 6 and the second roller 5b, respectively, and that it is assumed that the above-described rollers and gears are connected by gears (not illustrated) having the same diameter as those of the respective rollers. Note, naturally the present invention is not restricted to this.

An explanation will be made next of a paper feeding operation of the apparatus of FIG. 1. After the documents are placed on the hopper 3, the feed motor 51 is rotated in a direction of reverse rotation of the feed rollers 9. At this time, the first roller 5a and second roller 5b of the paper feed rollers 5 rotate in synchronization in a direction feeding out the paper. First, the first roller 5a feeds out a plurality of sheets (for example 10 to 20 sheets) of paper primarily separated through the slit 58 between the same and the gate plate 57 to a space between the second roller 5b and the separation pad 7B, subsequently the lowermost one sheet of paper separated by the second roller 5b and the separation pad 7B is fed out to the feed rollers 9 in a state where bent slightly downward along the circumferential surface of the second roller 5b. Then, after the front edge of the fed out paper is detected by the second paper feeding detection sensor 103, the feed motor 51 is further rotated exactly by a preliminarily set pulse number, and the front edge of the fed out paper is made to abut against the nip portion of the feed rollers 9, to slightly bend the same between the feed rollers 9 and the front end of the separation pad 7B. Then, the feed rollers 9 are rotated forward. The front edge of the paper fed out by this operation is aligned in a direction parallel to the shaft of the feed roller 9, that is, the skew is corrected, and the paper is fed to the reading portion "a" in a state where gripped by the feed rollers 9. At this time, the paper feed rollers 5 are in a free rotation state due to the action of the one-directional clutch 22 interposed between the first transmission gear 4 and the second roller 5b. The two rollers 5a and 5b rotate at a speed according to the movement of the paper fed by the feed rollers 9.

When the paper fed into the reading portion "a" is further fed and gripped by the eject rollers 13 and the rear edge of the paper is separated from the feed rollers 9 and reaches the position of the paper rear end detection sensor 105, the rotation of the feed motor 51 is reversed again at this position. By this operation, the next paper on the hopper 3 is fed out toward the feed rollers 9. When the feed rollers 9 are switched to the forward rotation side again, also the eject rollers 13 start rotation in the forward direction again and feed out the previous paper to the stacker 15 (FIG. 50). In this way, the sheets of paper stacked on the hopper 3 successively pass through the reading portion "a" in a state with an interval equal to the distance between the feed rollers 9 and the paper rear edge detection sensor 105 is formed and are ejected to the stacker.

Figure 2:
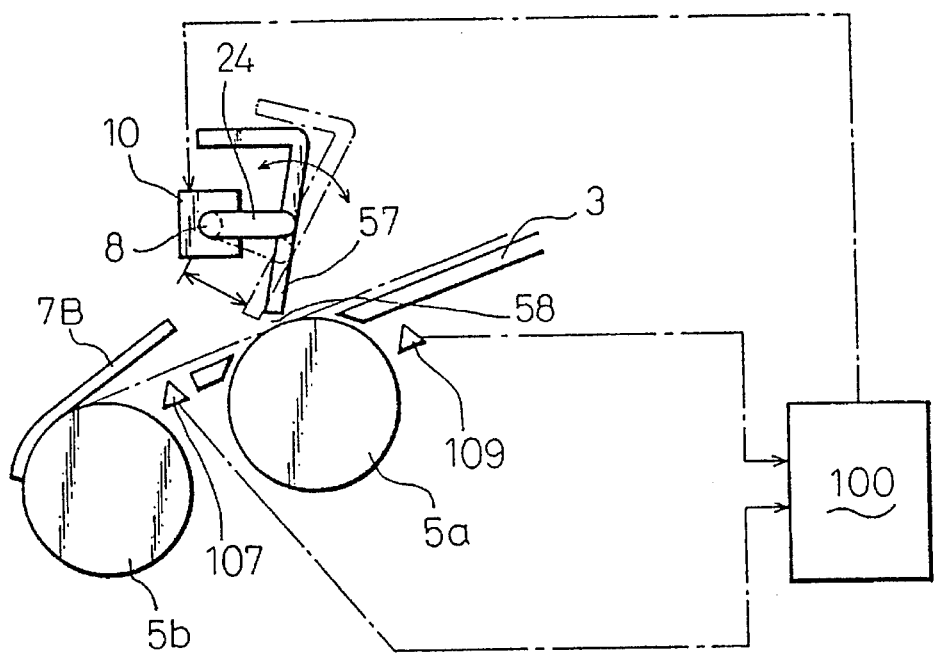
FIG. 2 is a side view showing a variable angle construction of a gate plate.
Figure 3:
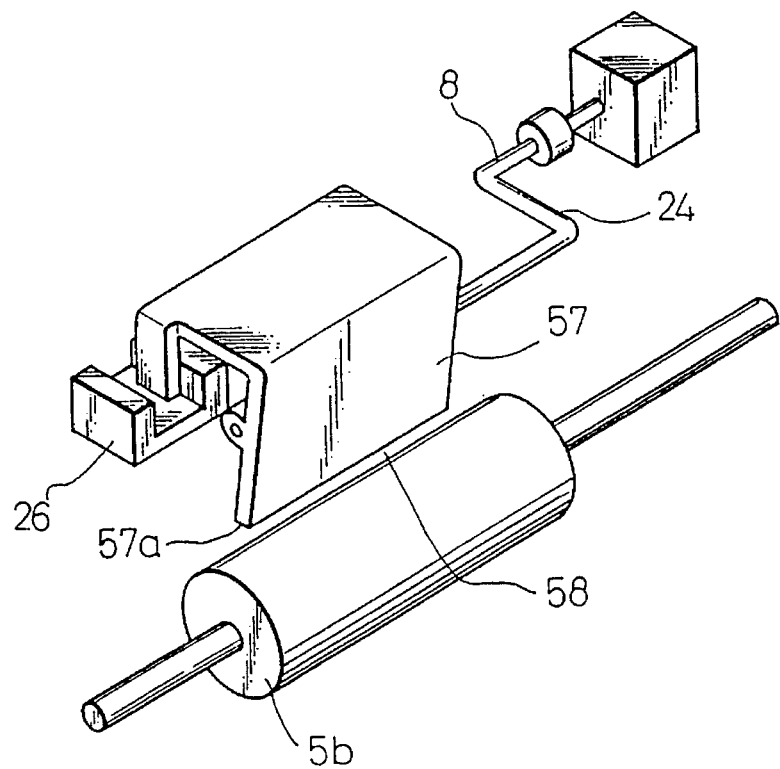
FIG. 3 is a perspective view showing the variable angle construction of the gate plate.

FIG. 2 and FIG. 3 show an example in which the gate plate 57 of the embodiment of FIG. 1 is given a variable angle construction. The gate plate 57 is secured to the front end of a bent arm 24 of a support shaft 8 rotated by a gate opening and closing motor 10. By rotating the gate opening and closing motor 10 in the forward and reverse directions, the gate plate is moved in inclination as shown in FIG. 2 about the support shaft 8 as the center. The support shaft 8 is preferably set at a position so that the clearance of the slit between the front end of the gate plate 57 and the first roller 5a is slightly enlarged when the gate plate 57 is turned in a direction increasing the inclination angle of the gate plate 57. The amount of change of the clearance of the slit 58 when the gate plate 57 is moved in inclination can be appropriately set by the length of the arm 24. The reference inclination angle of the gate plate 57 can be detected by a home position detection sensor (optical sensor) 26 shown in FIG. 3. The reference angle of the gate plate 57 is set at the position at which the gate plate 57 is the most vertical. Between the first roller 5a and the second roller 5b, a first paper feeding detection sensor 107 detecting the feeding of the paper from the slit 58 is provided. An empty sensor 109 detecting the presence or absence of the paper on the document stand is provided on the hopper 3. Note that the above-described sensors may be well known ones. Also, the detection signals thereof are sent to the controller 100.

An explanation will be made next of an angle setting operation of the gate plate 57 of FIGS. 2 and 3. In an initial state where the empty sensor 109 detects the absence of paper, the gate plate is set at the initial position which is detected by the home position detection sensor. This initial position is a position at which the inclination angle of the gate plate 57 becomes smallest.

When sheets of paper are carried on the hopper 3 and the paper feed roller 5 is rotated, if the carried paper is easily fed paper, even if the inclination angle of the gate plate 57 is small, the paper is fed out through the slit 58, this is detected by the first paper feeding detection sensor 107, and no rocking operation of the gate plate 57 occurs. On the other hand, when the paper is difficult to feed paper, even if the first roller 5a is rotated in this state, the paper is not fed out. At this time, the first paper feeding detection sensor 107 does not detect paper even when a certain time elapses after the first roller 5a is rotated, and therefore a rotation instruction is given to the gate opening and closing motor 51 from the controller 100, and the gate plate 57 is rocked in a direction increasing the inclination angle exactly by a preliminarily set amount. When the first paper feeding detection sensor 107 does not yet detect paper after waiting for a predetermined time again, the rotation instruction is given again from the controller 100 to the gate opening and closing motor 51, and the gate plate 57 is further inclined. In this way, when the inclination angle of the gate plate 57 is increased, the abutment force between the paper and the first roller 5a is increased by the wedging action thereof, and therefore the paper starts to be fed out from the slit 58 at a certain point of time. By this, that paper is detected by the first paper feeding detection sensor 107. Thereafter the first paper feeding detection sensor 107 continuously detects the paper until the feeding of all paper is ended, and therefore the gate plate 57 retains the angle when the supply of the paper is initially started, so the angle of the gate plate is automatically set in accordance with the nature of the paper. Then, when the documents 1 are all supplied and the absence of the paper is detected by the empty sensor 109, the instruction for rotation instruction in the reverse direction is given to the gate opening and closing motor 51, to restore the angle of the gate plate 57 to the reference angle.

According to this invention explained above, the settability of the documents on the hopper is enhanced. Even if the documents are casually set, a stable paper feeding performance can be obtained, and the working load of the operator can be reduced. Also, it becomes possible to increase the amount of stacking of the paper on the hopper. The automatic feeding of documents having a paper thickness which was impossible in the conventional bottom take-out type becomes possible. Also, the fluctuation of the relationship of force between the paper feeding force and resistance at the paper separation portion is small, and therefore a stable paper feeding performance is exhibited with respect to all paper.

Also, in the case of a construction with a variable angle of the gate plate, by changing the angle of the gate plate, feeding becomes possible without paper misfeeding of thick paper documents due to the wedging effect. At the same time, by changing the gate gap, double feed produced by a large number of thin paper documents being taken into the separation pad portion can be prevented.

Also, by adopting a connection construction in which the feed roller and the supply roller are rotated in a reverse direction from each other via a one-directional clutch, paper skewing is reduced by the front edge alignment function, and the through-put can be improved by improvement of the paper feeding speed.

The two-side reading type apparatus shown in FIG. 4 will be explained later.

Figure 5:
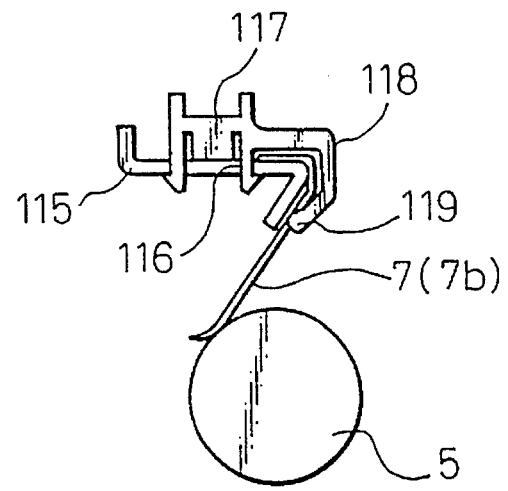
FIG. 5 is a side view of a paper separation portion.
Figure 6:
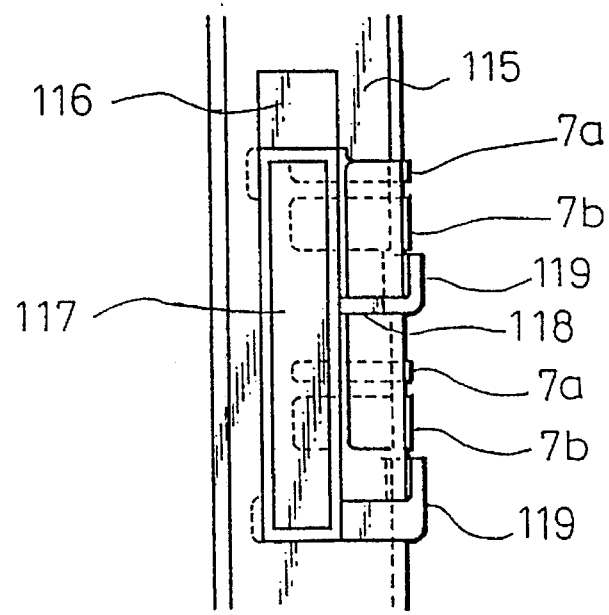
FIG. 6 is a plan view of the paper separation portion.

FIGS. 5 and 6 show the paper separation portion of a bottom take-out type automatic paper feeding apparatus of the image reading apparatus of this invention. As mentioned before, the paper feed roller 5 is rotated counterclockwise in FIG. 5 by the drive mechanism shown in FIG. 1 and feeds out the lowermost sheet of the documents, which are inserted stacked between the paper feed roller 5 and the conveyance spring 7, leftward in the figure. As shown in the plan view of FIG. 6, in the conveyance spring 7, two fixed separation springs 7a and moveable separation springs 7b formed in a thin and long tongue piece are provided on the seat plate 115 while fixing the base ends on the seat plate 115 in the document width direction.

A rectangularly shaped guide hole 116 which is long in the document width direction is provided on the seat plate 115. A slider 117 is attached to a guide hole 116 thereof so that it can freely slide in the longitudinal direction. Arms 118 are provided at the slider 117 so as to be projected therefrom at the same interval as the interval of the two moveable springs. Cam pieces 119 are provided at front ends of these arms 118. The cam piece 119 intrudes to the bottom of the moveable spring 7b so as to push the surface of the moveable spring 7b on the right side of FIG. 5 when the slider 117 on the figure is moved upward from the state of FIG. 6 and gives an abutment force in a direction separating the front end of the moveable spring 7b from the paper feed roller 5.

Accordingly, when the slider 117 is gripped by the fingers and moved upward in FIG. 6, the moveable spring 7b is separated from the paper feed roller 5 and the biasing force of the spring as a whole becomes weak. When the slider 117 is moved downward in FIG. 6, the cam piece 119 is detached from the moveable spring 7b and the moveable spring 7b is elastically pressed against the paper feed roller 5. Therefore, the biasing force of the spring 7 as a whole becomes large. The biasing force of the spring 7 is adjusted in accordance with the quality of paper of the document by setting things so that the biasing force of the spring 7 is made large when the paper of the document is thick and so that the biasing force of the spring 7 is made small when the paper of the document is thin.

Figure 7:
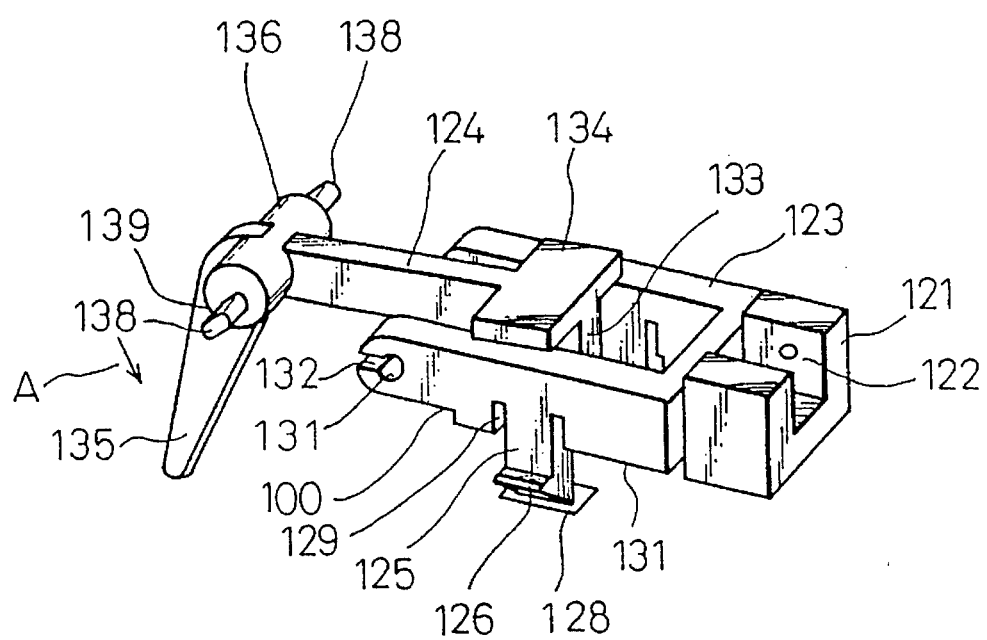
FIG. 7 is a disassembled perspective view of a paper width detection sensor.

FIG. 7 shows the document width detection sensor (corresponding to the sensor 35 of FIG. 1) improved by the present invention. The paper width detection sensor comprises three members of an opto-electric sensor 122 accommodated in a U-shaped housing 121, a sensor bracket 123, and a sensor arm 124. The sensor bracket 122 and the housing 121 thereof are well known. The sensor bracket 123 is formed in the shape of a frame and has two projections 125 projecting out on the attachment surface 141 side thereof. Claw pieces (hooks) 126 facing outward are integrally formed at the front ends of the projections 125. Slit holes 128 are formed in the frame 100 of the automatic paper feeding apparatus at positions corresponding to the projections 125. Recesses 129 for giving a flexible elasticity to the projections 125 are provided at the root portions of the projections 125. Through holes 131 are provided in the pair of projecting bearing portions of the sensor bracket 123 on the same axial lane. Recesses 132 having narrower widths than the diameters of the penetration holes 131 are provided so as to open the sides of the penetration holes 131.

The sensor arm 124 is a seesaw lever-shaped arm integrally provided with a shielding plate 133, a stopper plate 134, and a detection lever 135 similar to those of the conventional construction. Supporting pins 138 having a shape obtained by chamfering in parallel the circumferential surface of a cylinder having a smaller diameter than the diameter of the penetration hole 131 by exactly the amount of the free gap to a thickness slightly narrower than the width of the penetration hole 131 are integrally formed on the two ends of that bearing portion 136 so that the direction of the parallel chamfered portion 139 and the direction of the recess 132 become different when the sensor arm 124 is attached to the sensor bracket 123. The sensor arm 124 is inserted from the recess 132 into the penetration hole 131 while matching the directions of the parallel chamfered portion 139 and recess 132 in a state where the sensor arm 124 is rotated in the counterclockwise direction by about 135 degrees from a state shown in FIG. 7 and pivoted in the clockwise direction thereat, whereby it is axially supported in the penetration hole 131.

In this way, when the projections 125 are inserted into the slit holes 128 and the sensor bracket 123 is attached to the frame 100 of the automatic paper feeding apparatus after the sensor arm 124 is axially supported by the sensor bracket 123, the pivoting of the sensor arm 124 in the clockwise direction of the figure is limited by abutment of the stopper plate 134 against the top surface of the housing 121 of the opto-electric sensor, and the pivoting in the counterclockwise direction in the figure is limited by abutment of the detection lever 135 against the frame 100 of the automatic paper feeding apparatus, therefore a state where the direction of the parallel chamfered portion 139 of the supporting pin 138 and the direction of the recess 132 of the sensor bracket coincide cannot be exhibited. Accordingly, the sensor arm 124 will never drop out. Note that, in this state, the shielding plate 133 cuts off the light path of the opto-electric sensor 122. When the document abuts against the detection lever 135 from the direction indicated by an arrow A of the figure, the sensor arm 124 pivots in the counterclockwise direction of the figure, and the shielding plate 133 retracts from the light path of the opto-electric sensor 122, and therefore the abutment of the document against the detection lever 135 can be sensed by this. By arranging a plurality of such detection sensors in the direction of width of the document, the paper width of the fed documents an be detected by a combination of ON and OFF signals thereof.

Figure 8:
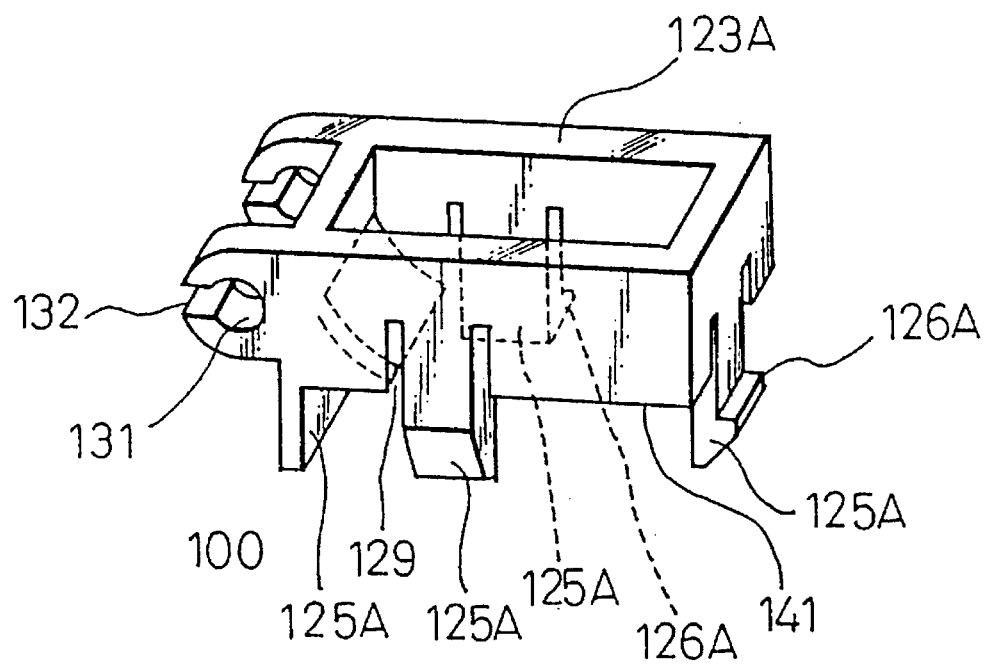
FIG. 8 is perspective view showing another embodiment of a sensor bracket of the paper width detection sensor.

Note that, FIG. 8 shows another embodiment of the sensor bracket, in which the rattling between the sensor bracket and the paper feed frame 100 when the former is attached to the latter can be further reduced. The sensor bracket 123A of this embodiment is provided with projections 125A for insertion through the slit holes provided in the paper feed frame on the attachment surface 141 side thereof at four portions, and provided with claw pieces 126A and 126A in two directions orthogonal to each other, thereby absorbing the rattling in two directions in the upper surface of the frame of the automatic paper feeding apparatus. The rest of the structure is similar to that of FIG. 7.

Figure 9:
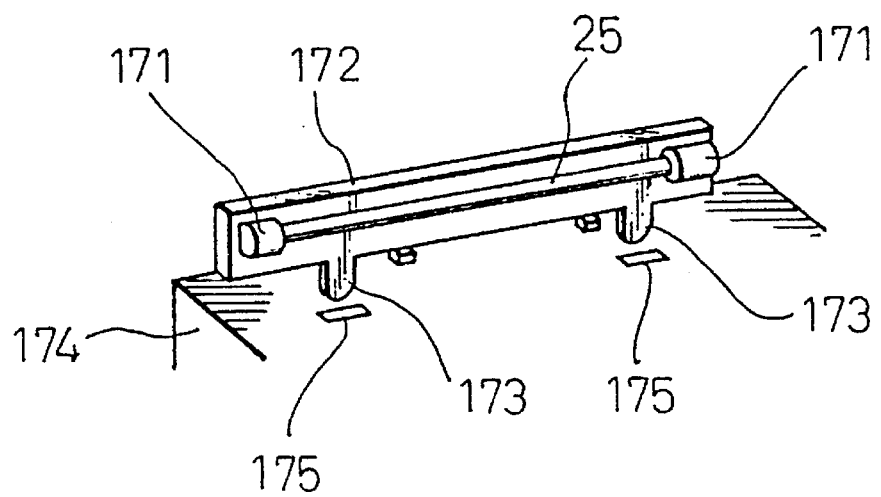
FIG. 9 is a perspective view showing the attachment structure of a light source lamp.
Figure 10:
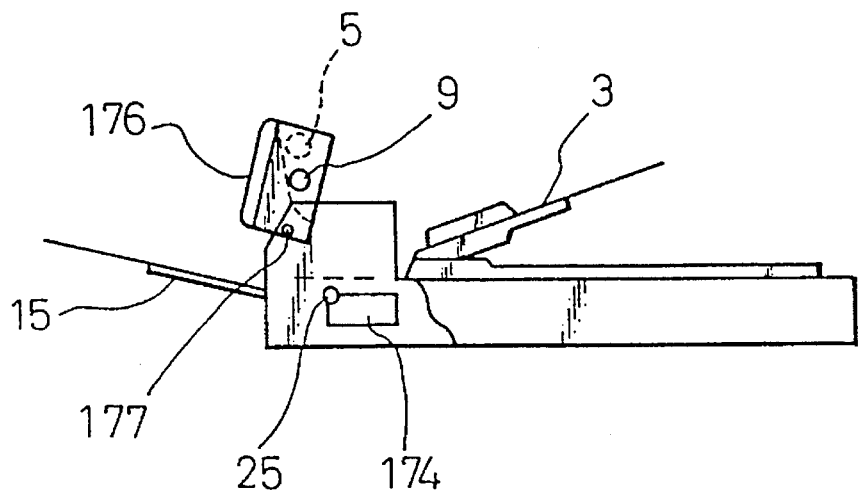
FIG. 10 is a side view showing an opening structure of an upper frame.

FIG. 9 shows an improved structure of attachment of a light source lamp 25 in the image reading apparatus of this invention, which has a simple shape in which projection pieces 173 are formed on the two sides of the longitudinal direction of the plate-shaped lamp frame 172 provided with sockets 171 for the light source lamp on the two ends in the longitudinal direction. The projection pieces 173 are inserted into the slit holes 175 provided in the frame 174 of the reading unit to support the light source lamp 25. As mentioned before, according to such a construction, as shown in FIG. 10, by opening the upper portion frame 176 of the image reading apparatus around the pivotally support shaft 177, attachment and detachment of the light source lamp 25 can be easily carried out. Also, the problem of the working space at the replacement of the light source lamp, the problem of reinforcing of the frame 174, etc. can be avoided.

Figure 11:
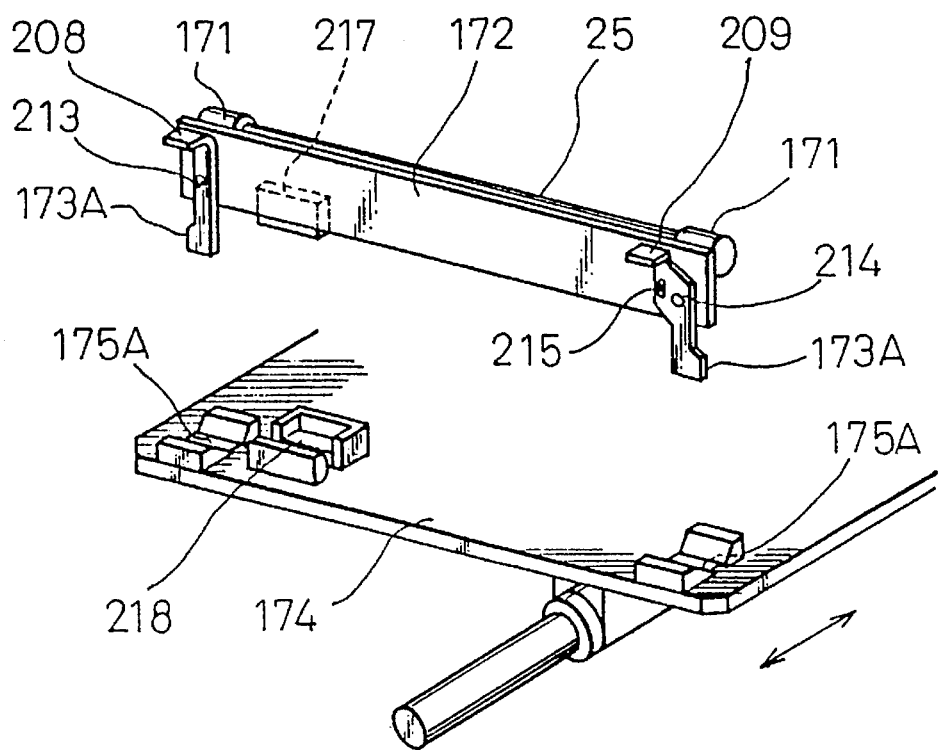
FIG. 11 is an explanatory view of the attachment method of the light source lamps.
Figure 12:
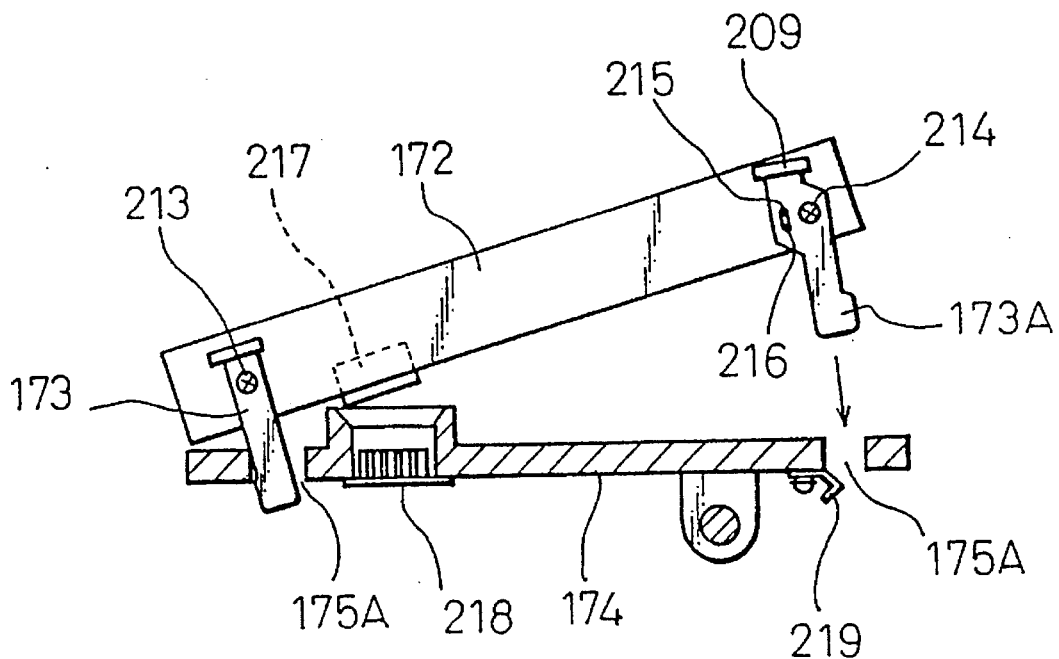
FIG. 12 is an explanatory view showing the attachment state of the light source lamps.
Figure 13:
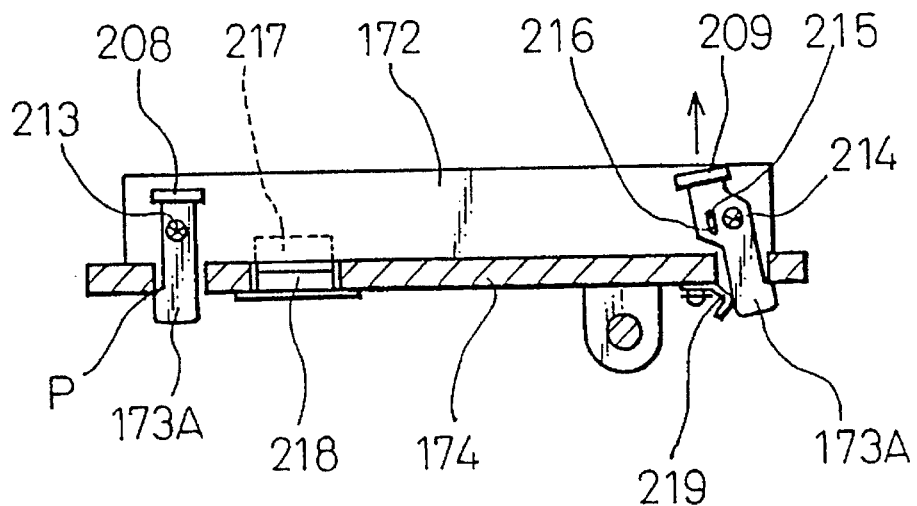
FIG. 13 is an explanatory view showing the attachment and lock state of the light source lamps.

FIG. 11 through FIG. 13 show another attachment construction of the light source lamp 25. On the back surface side (reverse light source lamp side) of the plate-like lamp frame 172, two engagement projection pieces 173A and 173A having grips 208 and 209 at the upper end are arranged at an interval between them. The engagement projection piece 173A on the left side is secured by a screw 213, and the engagement projection piece 173A on the right side is pivotally attached by a screw 214 attached with a spacer. An elongated hole 215 is provided in the engagement projection piece 173A on the right side in the vicinity of the screw 214. Into this elongated hole 215, a pin 216 implanted in the lamp frame 172 so as to stand up is inserted and engaged therewith. This pin 216 regulates the pivoting angle of the engagement projection piece 173A. Reference numeral 217 is a connector secured to the bottom side of the lamp frame 172. On the other hand, the frame 174 of the reading unit is provided with slit holes 175A and 175A into which the engagement projection pieces 173A and 173A are inserted and a connector 218 fitted on the connector 217. A plate spring 219 biasing the front end of the engagement projection piece 173A to be inserted in the engagement direction (counterclockwise direction of FIG. 13) is provided on the lower surface of the slit hole 175A on the right side. Note that, it is possible to replace the plate spring 219 by a tongue piece integrally formed with the frame 174 of the reading unit by shaping in the vicinity of the slit hole 175A.

For attachment of the lamp frame 172 to the frame 174 of the reading unit, the engagement projection piece 173A on the left side is inserted into the slit hole 175A on the left side, the engagement projection piece 173A on the right side is pushed into the slit hole 175A on the right side against the plate spring 219 by pivoting in the clockwise direction of the figure with the abutment portion P between the engagement projection piece 173A and the frame 174 of the reading unit as the center. At this time, the two connectors 217 and 218 are fitted with each other, to determine the relative position between the lamp frame 172 and the frame 174 of the reading unit. The engagement projection piece 173A on the right side of the positioned lamp unit 172 is pivoted in the counterclockwise direction in the figure by the plate spring 219 and engaged with the frame 174 of the reading unit to make the locked state of the lamp frame 172 more secure in association with the engagement projection piece 173A on the left side. When adopting such an attachment construction, it is possible to reliably prevent the detachment of the lamp frame by shock or vibration occurring during transportation etc. Also, when the lamp frame 172 is detached, if the grip 208 of the engagement projection piece on the left side is grasped by the left hand and the grip 209 of the engagement projection piece on the right side is grasped by the right hand so as to move the same upward, the engagement projection piece 173A on the right side pivots counterclockwise against the plate spring 219, and the engagement state is released, and therefore the detachment can be easily performed by pulling this upward in this state. Thus, also the problem of the working space at the replacement of the light source lamp and problem of reinforcing of the frame 174 etc. can be avoided.

According to this invention explained above, it is possible to constitute the image reading apparatus of a data processing apparatus with a remarkably smaller size in comparison with this type of conventional apparatus and to provide the apparatus at a lower cost by the reduction of the fabrication steps of parts and assembling steps.

Figure 4:
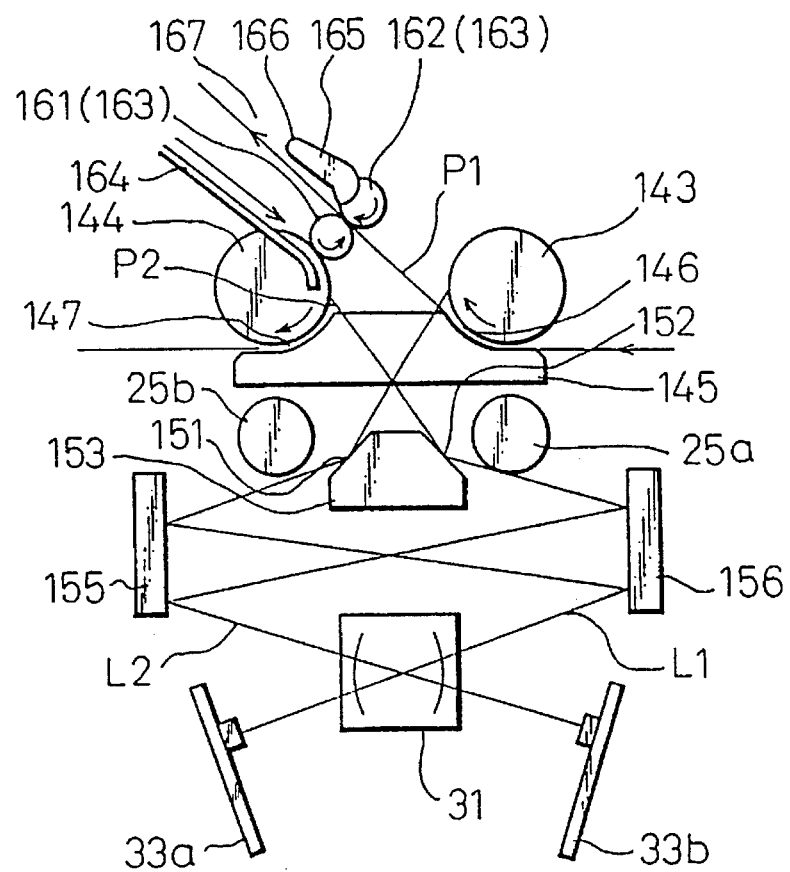
FIG. 4 is a side view showing one embodiment of a document feeding portion.

FIG. 4 is a side view showing an improvement of a reverse reading portion 167 of the image reading apparatus of this invention. On the upstream side and downstream side of the document passage, a first guide roller 143 and a second guide roller 144 having a white circumferential surface having the same shape are provided so that it can rotate in the clockwise direction of the figure by a not illustrated driving mechanism. A guide 145 comprising a transparent body of a trapezoidal cross-section having an arc slope on the two sides is provided beneath the guide rollers 143 and 144. Arc passages 146 and 147 through which the documents pass are formed between this transparent guide 145 and the guide rollers 143 and 144. Beneath of the guide rollers 143 and 144, a first light source lamp 25a is arranged opposite to the first guide roller 143, and a second light source lamp 25b is arranged opposite to the second guide roller 144. At an intermediate position of these two light source lamps 25a and 25b, a reflection body 153 provided with a first reflection surface 151 and a second reflection surface 152 are arranged. The first reflection surface 151 of the reflection body 153 is directed to the second guide roller 144 side, and the second reflection surface 152 is directed to the first guide roller 143 side.

The transparent guide 145 and the reflection body 153 have a horizontally symmetrical cross-sectional shape. The plane serving as the center of the symmetry is arranged so as to match with the symmetrical plane passing through the center of the two guide rollers 143 and 144. Beneath the reflection body 153, an imaging lens 31 with an optical axis which is the feeding direction of the document is arranged. At symmetrical positions with respect to the aforesaid symmetrical plane above and below this imaging lens 31, first and second sub-reflection surfaces 155 and 156 and first and second image sensors 33a and 33b are arranged so as to schematically face each other.

On the other hand, between the first guide roller 143 and the second guide roller 144, a pair of gripping rollers 163 comprising two rollers 161 and 162 which abut against each other and supported at the shaft in a free rotation state is provided so as to make that one roller 161 abut against the circumferential surface of the second guide roller 144. Above the second guide roller 144, an inversion stand 164 extending in the feeding direction of the documents fed out from the first guide roller 143 is provided. The document gripping portion of the gripping roller pair 163 is arranged at a position receiving the document fed out from the first guide roller 143. A switching lever 165 driven by a solenoid is arranged directly above the grasping roller pair 163 so that it can swing around the above supporting pin 166.

In the structure of the figure, when the document is supplied to the first arc passage 146 between the first guide roller 143 and the-transparent guide 145 from the right of the figure by the rotation of the first guide roller 143 and the feed roller 5 (FIG. 1) provided on the upstream side of the first guide roller 143, the document is bent inside the first arc passage 146 and fed out toward the gripping roller pair 163. When the document passes through the first arc passage 146, the front surface thereof is read at the first reading point $P_1$. The reading light $L_1$ of the first reading point $P_1$ is reflected at the first reflection surface 151 of the reflection body, the first sub-reflection surface 155, and the second sub-reflection surface 156, passes through the imaging lens 31 from the right side to the left side in the figure, and is read by-the first image sensor 33a arranged on the left side of the figure of the imaging lens 31.

The document fed out from the first arc passage 146 is pulled up to the left top of the figure while being gripped by the gripping roller pair 153. At the time at which the rear edge of the document passes the gripping roller pair 163, the switching lever 165 pivots clockwise in the figure and feeds the document fed into the reversing apparatus 167 to a space between the second guide roller 144 and the roller 161 abutting against this. The fed document is fed out downward while being gripped between the second guide roller 144 and the roller 161 abutting against this, is guided by the not illustrated guide along the circumferential surface of the second guide roller 144, and is fed into the second arc passage 147.

Then, the back surface of the document is read at the second reading point $P_2$ provided immediately before the document is fed into this second arc passage 147. The reading light $L_2$ of the second reading point is reflected at the second reflection surface 152 of the reflection body, is reflected at the second sub-reflection surface 156 and the first sub-reflection surface 155, passes through the imaging lens 31 from the left to the right of the figure, and is read by the second image sensor 33b arranged on the right side of the imaging lens 31. The document passes through the second arc passage 147 and is fed out to the stacker side on the left side of the figure while the back surface is being read in this way.

In the construction of the figure, the subsequent document can be fed upward by gripping the same by the gripping roller pair 163 constituted by the rollers 161 and 162 while feeding the previous document downward by gripping the same by the second guide roller 144 and roller 161. Therefore, processing so that the documents are successively fed into the reading portion and the front surface of the subsequent document can be read while performing the reading of the back surface of the previous document, so it is possible to read a large number of documents at a high speed by using the automatic paper feeding apparatus in combination.

Also, as apparent from the figure, it is possible to make the entire apparatus very compact, two reading lights $L_1$ and $L_2$ can be focused to two image sensors 33a and 33b by one imaging lens 31, and the shape and arrangement of the members are symmetrical, therefore the fabrication and assembly of parts are easy and also the assembly precision can be made correct.

FIG. 14 to FIG. 18 show an embodiment concerning an improvement of the locking mechanism of the frame body cover in the image reading apparatus of the present invention.

Figure 14:
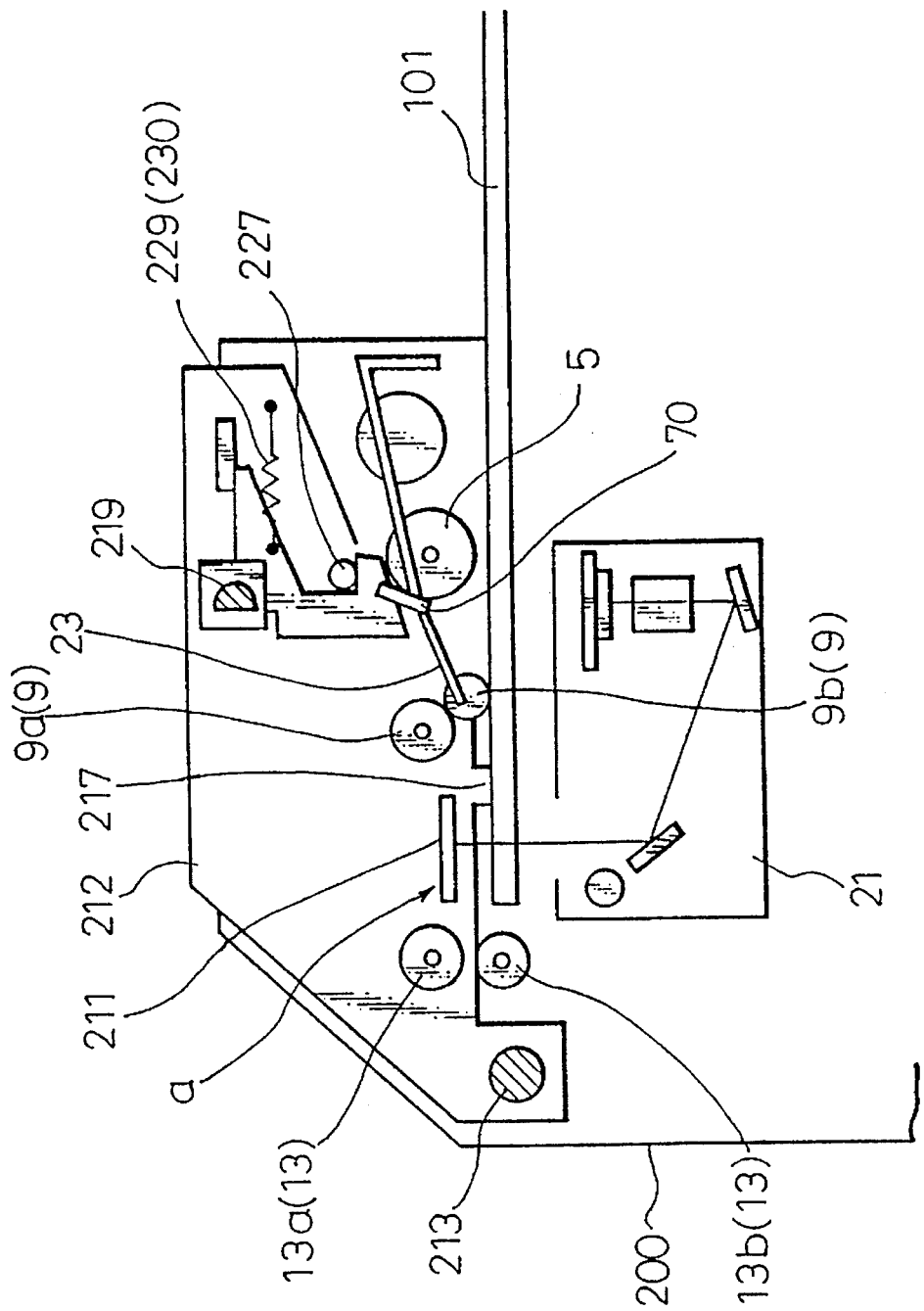
FIG. 14 is a diagrammatical side view of an image reading apparatus according to the present invention.

As shown in FIG. 14, the frame body cover 212 covering the paper passage 23 of a document feeding type document reading apparatus must be constructed to allow removal of the document without tearing when paper clogging occurs. For this reason, there is adopted a construction in which one of the separation roller 5 and the separation pad 7 arranged so as to face each other sandwiching the paper passage 23 therebetween, one of the optical reading unit 21 and the document backup member 211 arranged so as to face each other sandwiching the reading portion "a" therebetween, one of the side rollers 9a and 13a of the feed rollers 9 and 13, etc. are attached to the frame body cover 212 side. When the frame body cover 212 is opened, the paper passage 23 is almost completely opened.

In such a construction, when the frame body cover 212 is closed, it is necessary to correctly regulate the interval between the backup member 211 and optical reading unit 21 of the reading portion. For example, the positioning projections 217 and 218 regulating the position of the intermediate portion between the reference platen plane of the platen glass 101 or the like and the frame body cover 212 are provided on the two sides of the frame body cover 212. The frame body cover 212 is provided so that it can be freely opened or closed in such a manner that usually the base end is pivotally supported around the main body frame 200. Therefore the locking pairs 236 and 237 locking the frame body cover 212 to the main body frame 200 in the closed state is provided at the front end of the frame body cover 212. The paper passage 23 is opened between the frame body cover tip and the main body frame, and therefore there adopted a construction for this lock pair in which the frame body cover 212 and the main body frame 200 are stopped by engagement on the two sides of the front end of the frame body cover 212.

The lock pairs 236 and 237 provided on the two sides of the front end of the frame body cover 12 are constituted by hooks 221 and 222 and engagement pins 227 and 228 engaged with them. Springs 229 and 230 are provided biasing the hooks 221 and 222 in the locking direction.

Figure 15:
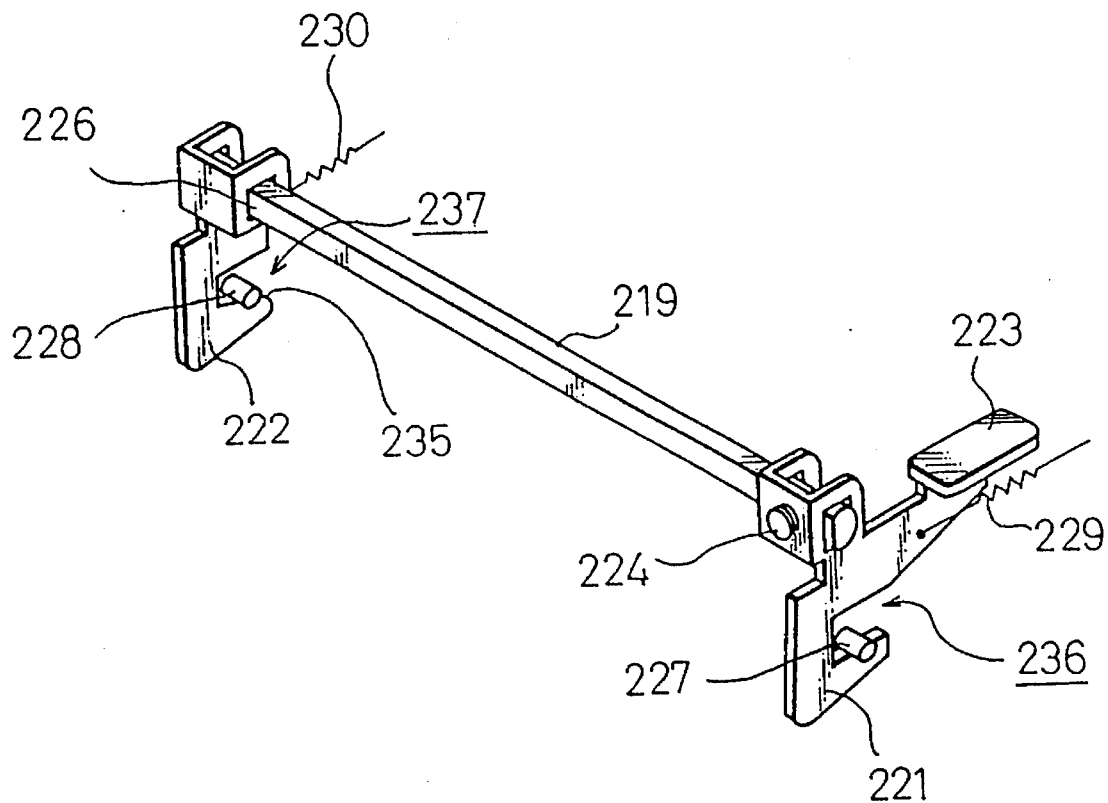
FIG. 15 is a perspective view of a locking mechanism of a frame body cover.

It is also possible to individually operate the hooks 221 and 222 of the lock pairs 236 and 237 provided on the two sides of the front end of the frame body cover 212, but it is convenient if, as shown in FIG. 15, hooks 221 and 222 on the two sides are connected by the connection shaft 219, the operation lever 223 is provided only in one hook 221, and the related operation lever 223 is operated, whereby the engagement and disengagement of hooks 221 and 222 on the two sides are simultaneously carried out.

However, the closing position of the frame body cover 212 is defined by the positioning projections 217 and 218 provided on the two sides of the intermediate portion of the frame body cover, and therefore where a construction is adopted in which the hooks 221 and 222 on the two sides are connected by a connection shaft 219, if there is an error in the positional relationship of the hooks 221 and 222 and the engagement pins 227 and 228, the operation of the hooks 221 and 222 stops in a state where only one of the hooks 221 and 222 is engaged with the engagement pin 227 or 228 thereof, to cause rattling in one engagement portion of the lock pair 236 and 237. For this reason, work of adjusting either of the hooks 221 and 222 or the engagement pins 227 and 228 so as not to cause rattling in the lock pairs 236 and 237 at the two sides at the assembly of the apparatus and of adjusting so that the locking operations of the lock pairs on the two sides are simultaneously carried out with a uniform force becomes necessary. Therefore, in the present invention, so as to make such positional adjustment work of the lock pairs on the two sides at the assembly of the apparatus unnecessary so as to reduce the number of assembly steps, a free clearance 226 is interposed between the connection member 219 connecting the hooks 221 and 222 on the two sides and at least one of the hooks, i.e., 222, and the engagement surface 235 of the hook 222 on the side at which the free gap 226 is interposed is used as the wedging surface.

According to this, when the frame body cover 212 is closed, even in a case where there is deviation in the relative positional relationship between the hooks 221 and 222 of the lock pairs 236 and 237 on the two sides and the engagement members 227 and 228, the hooks 221 and 222 on the two sides can solely operate only by the amount of the free clearance 226 provided between the connection member 219 and the hook 222. The operation force thereof is given by the lock springs 229 and 230 provided individually in the hooks 221 and 222, and therefore the engagement of the lock pairs 236 and 237 at the two sides is reliably carried out.

The fitting force between the hook 222 on the reverse operation lever side provided with the free clearance 226 and the engagement member 228 is determined to a certain extent by the inclination angle of the engagement surface 235 as the wedging surface of the related hook and the biasing force of the lock spring 230 thereof. Therefore, it becomes possible to set with what proportion the biasing force of the spring 213 biasing the frame body cover 212 in an opening direction is shared by the lock pairs 236 and 237 on the two sides by the inclination angle of the engagement surface 235 of the hook 222 on the reverse operation side and the biasing force of the lock spring 230.

Also, where the biasing force of the spring 213 biasing the frame body cover 212 in the opening direction is made to act upon the center of the frame body cover 212, the inclination angle of the engagement surface 235 of the hook 222 on the reverse operation lever side and the biasing force of the lock spring 230 on the related side are determined so that the lock pairs 236 and 237 on the two sides share each about half of the biasing force of the above-described spring 231. However, more preferably, the biasing force of the spring 213 biasing the frame body cover 212 in the opening direction is made to act upon the side at which the hook 221 directly operated by the operation lever 223 in an eccentric manner is provided, to reduce the locking force applied upon the hook 222 on the reverse operation lever side. The depression operation of the frame body cover 212 at the opening and closing of the frame body cover and the engagement and disengagement operations of the hooks 221 and 222 become smoother.

The motion of the operation lever 223 when the pair of lock 236 and 237 is released is transferred to the hook 222 on the reverse operation lever side with a delay of exactly the amount corresponding to the free clearance, but it is sufficient if the amount of operation of the operation lever 223 is increased by exactly the amount of the free movement of the free clearance 226. It is sufficient if this free clearance 226 has a size that can absorb the assembly error of the lock pairs 236 and 237 of the two sides, and therefore an increase of the amount of operation of the operation ever 223 is not a problem.

Below, a further detailed description will be made of the construction of the embodiment shown in FIGS. 14 to 18.

As shown in FIG. 14, a platen glass 101 guiding the lower surface of the document at the reading portion "a" is secured to the main body frame 200 and the optical reading unit 21 is positioned beneath this platen glass 101. In the main body frame 200, along the paper passage 23, the separation roller 5, the driven side roller 9b of the feed roller 9, and the driven roller 13b of the eject roller 13 are attached at the shaft; the frame body cover 212 (corresponding to the frame 176 of FIG. 10) is pivotally supported by the main frame 200 by the supporting shaft 213 (corresponding to the shaft 177 of FIG. 10). To this frame body cover 212, the separation pad 7 opposite to the separation roller 7, the drive side roller 9a of the feed rollers 9, and the drive side roller 13a of the eject rollers 13 are respectively attached.

On the two sides of the center portion of the frame body cover 212 in close contact with the reading portion "a" of the paper, positioning projections 212 and 218 (FIG. 16) abutting against the upper surface of the platen glass 101 are provided. Also, at the front end of the frame body cover 212, the connection shaft 219 parallel to the supporting shaft 213 is pivotally supported at the shaft. To the two ends of this connection shaft 219, hooks 221 and 222 on the two sides of the locking apparatus stopping the frame body cover 212 and the main body frame 200 by engagement are attached.

Figure 17:
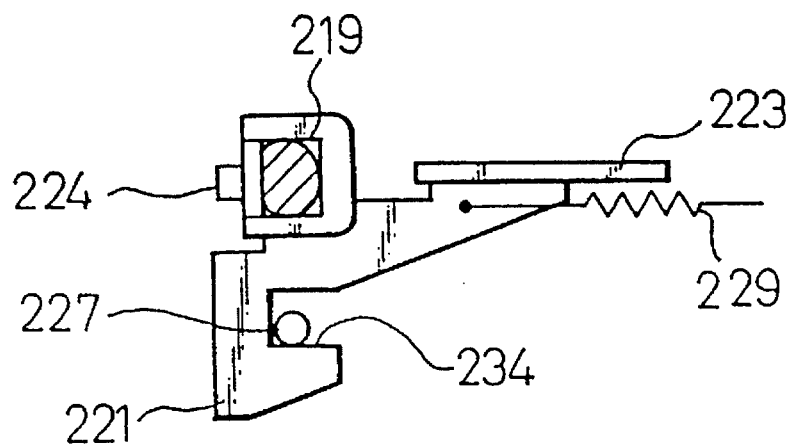
FIG. 17 is a side view of an operation side lock pair.
Figure 18:
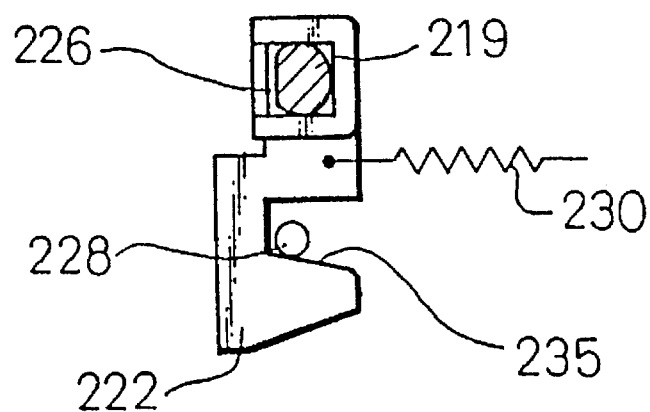
FIG. 18 is a side view of a reversing operation side lock pair.

As shown in FIG. 15, the hook 221 at the front side among the hooks 221 and 222 is defined as the operation side hook, an operation lever 223 is formed integrally with this hook 221, and the hook 221 is secured to the connection shaft 219 by the fixing screw 224. The connection shaft 219 is made a D-cut shaft with a flat plane formed at one portion on its circumference as shown in FIG. 17. The hook 222 on the reverse operation side is attached in a state where a free gap 226 which can slightly freely pivot is provided around the connection shaft 219 as shown in FIG. 18. The hooks 221 and 222 are shaped so that they are engaged with the engagement pins 227 and 228 implanted in the main body frame so as to stand up. Locking springs 229 and 230 individually biasing the hooks 221 and 222 in the directions for being engaged with the engagement pins 227 and 228, respectively, are provided.

Figure 16:
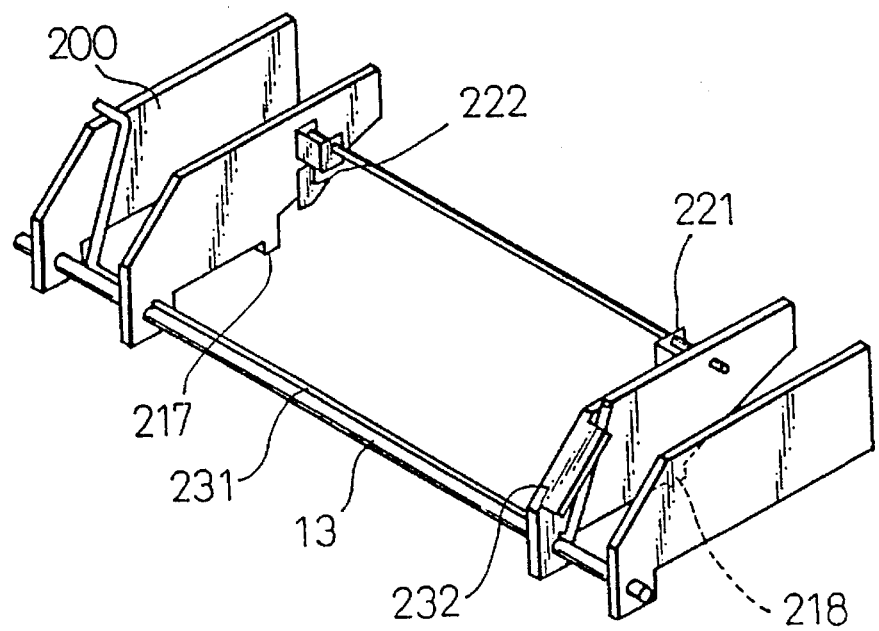
FIG. 16 is a perspective view of the structural members of the main body frame and the frame body cover.

As a spring for biasing the frame body cover 212 in the opening direction around the supporting shaft 213, a torsion bar 231 shown in FIG. 16 is used. The base end of this torsion bar is stopped by engagement at the main frame 200, and the other end (functional end) is stopped by engagement at the rib 32 on the operation hook 221 side of the frame body cover 212, which gives a biasing force eccentric to the operation hook 221 side of the frame body cover 212.

The operation side hook 221 is shaped so that, as shown in FIG. 17, the engagement surface 234 engaged with the engagement pin 227 is a surface in the tangential direction at the pivoting of the hook 221. The engagement surface 234 and the engagement pin 227 reliably abut against each other by the biasing force of the torsion bar 231. On the other hand, the engagement surface 235 of the hook 222 on the reverse operation side serves as the wedging plane as shown in FIG. 18. A locking force caused by the wedging action is produced between the wedging plane 235 and the engagement pin 223 by the biasing force of the lock spring 230 biasing this hook 222 in the locking direction.

Accordingly, in the closed state of the frame body cover 212, the frame body cover 212 is positioned by three points of the positioning projections 217 and 218 on the two sides of the intermediate portion thereof and the lock pair 236 of the operation side. The biasing force of the torsion bar 231 acting while being eccentric to the operation lever 223 side is received by the engagement of the operation side lock pair 236. Then, the lock pair 237 on the reverse operation side absorbs the position error existing between the two lock pairs 236 and 237 by the inclination of the wedging plane 235 of the hook and the free clearance between the gap between the connection shaft 219 and the hook 222. The locking force produced by the wedging action based on the inclination of the wedging plane 235 of the hook and the biasing force of the lock spring 230 functions to reliably make the positioning projection 217 on the reverse operation lever side to abut against the platen glass 101, to stabilize the closed state of the frame body cover 212 and, at the same time, correctly regulate the positional relationship between the frame body cover 212 and the main body frame 200 at the reading portion "a".

EFFECT OF THE INVENTION

According to the construction shown in FIG. 14 to FIG. 18, it becomes unnecessary to adjust the positional relationship of mutually engaging elements of the lock pairs provided on the two sides of the front end portion of the frame body cover, and the number of the assembly steps can be reduced. Also, the opening and closing operation of the frame body cover can be carried out on one side of the frame body cover. The operability at the opening and closing of the frame body cover in the apparatus in which the frame body cover is provided so as to be laterally opened is improved. Further, it is possible to set the biasing force of the opening spring of the frame body cover and the locking force of the lock pairs on the two sides with a good balance, and the positional relationship between the frame body cover and the main body frame in the document reading portion can be correctly regulated.

FIGS. 19 to 26 show an embodiment directed to an improvement of the paper guide mechanism provided in the hopper.

In the image reading apparatus of the present invention, use is made of a paper guide guiding the paper in a state where the center thereof is made coincident with the center thereof, the hopper (document stand), or the paper passage (with a so-called center reference). An explanation will be made below of an apparatus for adjusting the position of that guide in accordance with the width dimension of the paper.

In the paper guide guiding the paper with the center reference, it is necessary to move the paper guides on the two sides symmetrically with the center of the paper stand or paper passage when the width of the used paper is changed. If the construction is one in which the paper guides on the two sides must be individually set, the work for setting the paper guide becomes cumbersome.

Therefore, there is conventionally adopted a construction in which the paper guides on the two sides are connected by a symmetrical movement mechanism utilizing a rack and pinion mechanism or winding transmission mechanism so that when either one of the paper guides is operated, the other paper guide symmetrically moves.

Nevertheless, the paper guides act to regulate the position of the paper in the width direction, and therefore guides which easily move cannot perform the function of guides. For this reason, useless movement of the paper guides is prevented by utilizing the friction with the paper stand or the like, but if the frictional force is made excessively large, force becomes necessary for the movement of the paper guides when the paper width is changed. Particularly when the guide width is to be set by operating only the paper guide on one side, the paper guide is moved in inclination due to deviation between in the line of action of the operating force transferred via the symmetrical movement mechanism to the paper guide on the opposite side and the frictional force, so that sticking occurs between the same and the immoveable member guiding this, whereby smooth movement of the paper guide is frequently inhibited. Moreover, the retention of position by the frictional force is insufficient in stability, and therefore a case where the paper guides open during use due to vibration etc. frequently occurs.

Therefore, consideration may be given to a construction in which a locking mechanism is provided in the paper guides so that when the locking releasing piece adjacent to the guide wall of the paper guide is gripped, the locking is released to enable movement of the paper guides in the width direction. In paper guides with the center reference, however, where the locking releasing piece is provided at only one paper guide, the paper guide cannot be positioned unless the paper guide on that side is operated. When locking releasing pieces are provided at the paper guides on both sides, the paper guide cannot be positioned unless the paper guides on both sides are simultaneously operated. Thus, this is inconvenient.

Therefore, the present invention provides paper guides with a center reference designed to hold the set position of the paper guides by a locking mechanism, wherein provision is made of an interval setting apparatus wherein simultaneous positioning of the paper guides on the two sides is enabled by the operation of either one of the locking releasing pieces provided at the paper guides on the two sides.

In FIGS. 19 to 23, the locking releasing pieces 306a and 306b releasing the lock of the paper guides are provided at the paper guides 301a and 301b at the two sides connected by a symmetrical movement mechanism 304. The locking releasing pieces 306a and 306b on the two sides are connected by a second symmetrical movement mechanism 314 which is the same type as the above-described symmetrical movement mechanism 304. The locking releasing pieces 306a and 306b are biased in the locking direction of the locking mechanism 317 by a spring (plate spring) 307. The symmetrical movement mechanism 304 and the second symmetrical movement mechanism 314 are provided in a parallel arrangement in a stacked state on each other so that they can independently move from each other.

As the symmetrical movement mechanisms 304 and 314, a rack and pinion mechanism shown in the following embodiment and the winding transmission mechanism can be mentioned as an example. They are constructed so that linear movement members 302, 312, 323, and 324 connected to two paper guides 301a and 301b, respectively, are synchronized by rotation members 303, 313, 321, and 322. Where a construction is adopted in which the paper guides 301a and 301b are supported by a parallel link so that they can swing in parallel, other than a mechanism for synchronizing the rocking members on the two sides by gears etc., a symmetrical movement mechanism using a pantograph link etc. can be adopted.

The relative movement of the locking releasing pieces 306a and 306b on the two sides connected by the symmetrical movement mechanism 314 with respect to the paper guide thereof is transferred to the second symmetrical movement mechanism 314 even in a case where one of them is operated. The second symmetrical movement mechanism 314 performs the same motion when any of the locking releasing pieces 306a and 306b is operated. Accordingly, if the locking mechanism 317 is connected to this second symmetrical movement mechanism 314 and the locking is released, even if one of the locking releasing pieces is operated, the locking of the paper guides 301a and 301b is released.

Also, when the paper guides 301a and 301b are moved, the second symmetrical movement mechanism 314 performs the same motion as that of the symmetrical movement mechanism 304 connecting the paper guides 301a and 301b and absorbs the change of interval between the locking releasing pieces 306a and 306b at the two sides. Accordingly, the second symmetrical movement mechanism 314 performs two functions, i.e., a function of transferring the locking releasing force and a function of enabling a symmetrical movement of the locking releasing pieces 306a and 306b on the two sides.

Also, the same types are used in parallel as the (first) symmetrical movement mechanism 304 and the second symmetrical movement mechanism 314, and therefore the shaft supporting construction of the guides of for example the linear movement members 302 (302a, 302b), 312 (312a, 312b), 323, and 324, and the rotation members 303, 313, 321 (321a, 321b), and 322 (322a, 322b) can be made common, and the increase of cost due to the provision of the second symmetrical movement mechanism 314 can be minimized.

A detailed explanation will be made below of the embodiment shown in FIG. 19 to FIG. 26.

Figure 26:
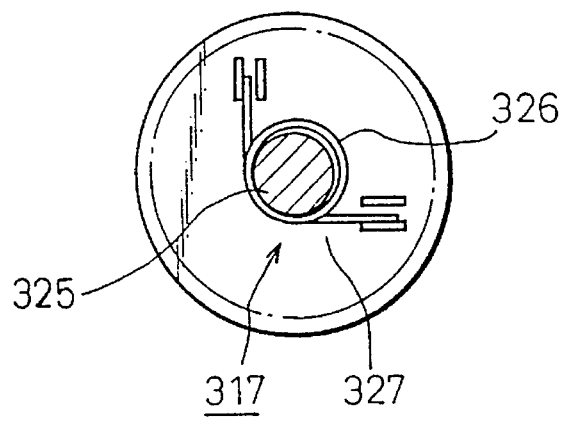
FIG. 26 is a cross-sectional plan view showing a further embodiment of the locking mechanism.

FIG. 19 to FIG. 24 show a first embodiment of the guide mechanism having a variable width. To the paper guides 301a and 301b attached to the hopper (paper holder) 3 (FIG. 1) so that linear movement can be freely performed in the width direction of the paper, as shown in FIG. 26, racks 302a and 302b similar to those in the conventional apparatus are secured. These racks 302a and 302b are engaged with the two sides of the pinion 303 secured in the free rotation state to the center of the paper stand, whereby the symmetrical movement mechanism 304 is constituted.

On the back surface of the paper guides 301a and 301b, the locking releasing pieces 306a and 306b are pivotally supported by the pins 305a and 305b in a direction parallel to the side of the paper. At least one locking releasing piece 306a is biased by the spring 307 toward the outside. The tongue pieces 308a and 308b extended downward are integrally provided in the locking releasing pieces 306a and 306b. These tongue pieces 308a and 308b are freely fitted in square holes 309a and 309b provided in the second racks 312a and 312b attached in the stacked state on the aforesaid racks 302a and 302b in a slightly rockable state. The two second racks 312a and 312b are engaged with the two sides of the second pinion 313 which has the same shaft as the aforesaid pinion 303 and independently axially supported in the free rotation state.

When the right side locking releasing piece 306a is gripped in a space with the guide wall of the paper guide 301a and the locking releasing piece 306a is pivoted inward, due to the rocking of the tongue piece 308a to the outside, the second rack 312a on the right side is moved to the outside. This movement motion is transferred via the second pinion 313 to the second rack 312b on the left side to move this to the outside and swing the tongue piece 308b of the locking releasing piece 306b on the left side connected to the left side second rack 312b by the connection pin 309b to the left side. Therefore, also the locking releasing piece 306b on the left side swings to the inside. Also, when the locking releasing piece 306b on the left side is operated, similarly, the locking releasing piece 306a on the right side swings to the inside.

Also, even in a state where the locking releasing pieces 306a and 306b are rocked inward, the second symmetrical movement mechanism 314 is not impaired in its original function, and therefore if one of the paper guides 301a and 301b is operated in this state, the paper guides 301a and 301b on the two sides symmetrically move by the function of the symmetrical movement mechanism 304, and the locking releasing pieces 306a and 306b on the two sides symmetrically move together with the paper guides 301a and 301b by the function of the second symmetrical movement mechanism 314. Even during this movement, due to the rocking of the locking releasing piece 306a, a state where the second racks 312a and 312b move to the outside is maintained, and therefore also a state where the locking releasing pieces 306a and 306b on the two sides are synchronously rocked is maintained.

The locking shaft 315 is fixed on the paper stand parallel to the direction of movement of the paper guide 301a. The through-hole (locking hole) 316 provided in the tongue piece 308a of the locking releasing piece on the right side of the figure is loosely fitted on this locking shaft 315. The tongue piece 308a of the locking releasing piece 306a is provided in a direction orthogonal to the locking shaft 315 when the locking releasing piece 306a is slightly pivoted inward. When the locking releasing piece 306a is pivoted to the outside by the spring 307, the tongue piece 308a of the locking releasing piece becomes oblique relative to the locking shaft 315, so that upper and lower pieces of the locking shaft 315 and the through-hole 316 abut against each other, whereby the rocking angle of the locking releasing pieces 306a and 306b to the outside is regulated (a part of enlarged view of FIG. 21).

When the paper guides 301a and 301b are pushed to move to the outside in a state where the locking releasing piece 306a is pivoted to the outside in this way, the tongue piece 308a of the locking releasing piece 306a is further inclined with respect to the locking shaft 315, and therefore the upper and lower pieces of the locking shaft 315 and the through-hole 316 are strongly pressed, to inhibit movement of the paper guides 301a and 301b. Namely, in this embodiment, the locking mechanism 317 is constituted by the locking shaft 315 and the through-hole 316 provided in the tongue piece 308a of the locking releasing piece on the right side of the figure. The locking is performed by the biasing force of the spring 307, and the movement of the paper guides 301a and 301b is inhibited. In a locking mechanism having such a construction, the resistance with respect to the force moving the paper guides 301a and 301b to the inside is weak, but the movement of the paper guides to the inside is inhibited by the side of the paper guided by this, and therefore there arises no problem. This rather smoothens the movement of the paper guides 301a and 301b to the inside.

Figure 24:
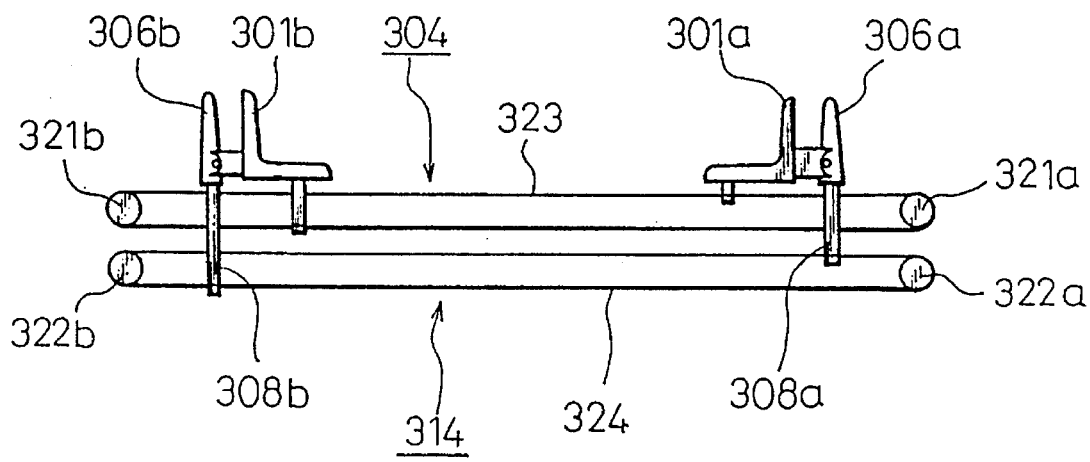
FIG. 24 is a side view diagrammatically showing another embodiment of the symmetrical movement mechanism.

The above-described embodiment uses the rack and pinion mechanism as the symmetrical movement mechanism. As shown in FIG. 24, wires 323 and 324 are suspended around pulleys 321a and 321b and 322a and 322b having the same shape, which are axially supported at the two sides in a state enabling them to freely rotate, so that the paper guides 301a and 301b are brought into association with one wire 323. The locking releasing pieces 306a and 306b are brought into association with the other wire 324, whereby the symmetrical movement mechanism 304 for the paper guide and the second symmetrical movement mechanism 314 for the locking releasing piece can be constituted. In this case, the paper guides 301a and 301b and locking releasing pieces 306a and 306b on the two sides of course must be connected to the opposite positions sandwiching the pulleys of the wires 323 and 324, respectively.

Figure 25:
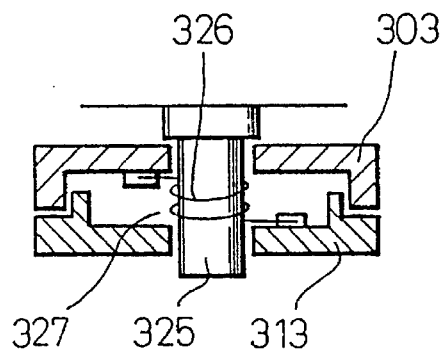
FIG. 25 is a cross-sectional view showing another embodiment of the locking mechanism.

FIG. 25 and FIG. 26 show another example of the locking mechanism which can be used in the apparatus of this invention, in which the rotation of the rotation members such as the pinions 303 and 313, the pulleys 321a and 322a, etc. interposed in the symmetrical movement mechanisms 304 and 314 is locked. Explaining this by taking as an example a case of mounting inside the pinions 303 and 313 of the embodiments of FIGS. 19 to 23, a spring clutch 327 provided with a coil portion 326 elastically secured to the circumferential surface of the supporting shaft 325 in the free state is inserted into the immoveable supporting shaft 325 supporting the pinions 303 and 313 at the shaft in the free rotation state. The two ends of this spring clutch are engaged with the first pinion 303 and the second pinion 313, respectively. The winding direction of the spring clutch 327 around the supporting shaft 325 is a direction in which the spring clutch 327 is wound again by the relative pivoting of the second pinion 313 with respect to the first pinion 303 when the second racks 312a and 312b move to the outside with respect to the first racks 302a and 302b, and the coil portion 326 is loosened.

This spring clutch 327 performs a function of inhibiting the motion of the first and second pinions 303 and 313, that is, the first and second symmetrical movement mechanisms 304 and 314, when the coil portion 326 comes into close contact with the support shaft 325 in the free state and, at the same time, performs another function in which the second racks 312a and 312b are biased toward the inside with respect to the first racks 302a and 302b, to keep the locking releasing pieces 306a and 306b in the opened state. It performs the same function as that of the spring 307 shown in FIG. 21.

In this construction, when either one of the locking releasing pieces 306a and 306b is operated, the second racks 312a and 312b connected to this move relatively to the outside with respect to the first racks 302a and 302b. By the relative pivoting of the second pinion 313 with respect to the first pinion 303 produced by this, the fixed state with respect to the support shaft 325 of the spring clutch 327 is released. The first pinion 303 and the second pinion 313 are made integral around the support shaft 325 in a state retaining the mutual relative phase angle to become freely rotable in state.

Accordingly, when either one of the locking releasing pieces 306a and 306b is operated to operate the paper guides 301a and 301b, after the locking by the spring clutch 327 is released, the first pinion 303 and the second pinion 313 are integrally rotated, whereby it becomes possible to move the paper guides 301a and 301b to the free position retaining their symmetrical positional relationship. By releasing the operating force of the locking releasing pieces 306a and 306b, the rotation of the pinions 303 and 313 is locked, to inhibit the movement of the paper guides 301a and 301b.

According to this embodiment explained above, it becomes possible to move the paper guides on the two sides to any position while retaining the symmetrical relationship thereof by releasing the locking by operating either one of locking releasing pieces provided in the two paper guides, positioned symmetrically with the center reference. Therefore, it becomes possible to set up the paper guides by one hand from any side of the apparatus, and there is an effect of an improvement of the operability. Also, since the paper guides are kept by the locking mechanism in the set position, the paper guides will not be opened by vibration etc. during use, and also the motion of the paper guide at the setting of the position is smooth.

Figure 27:
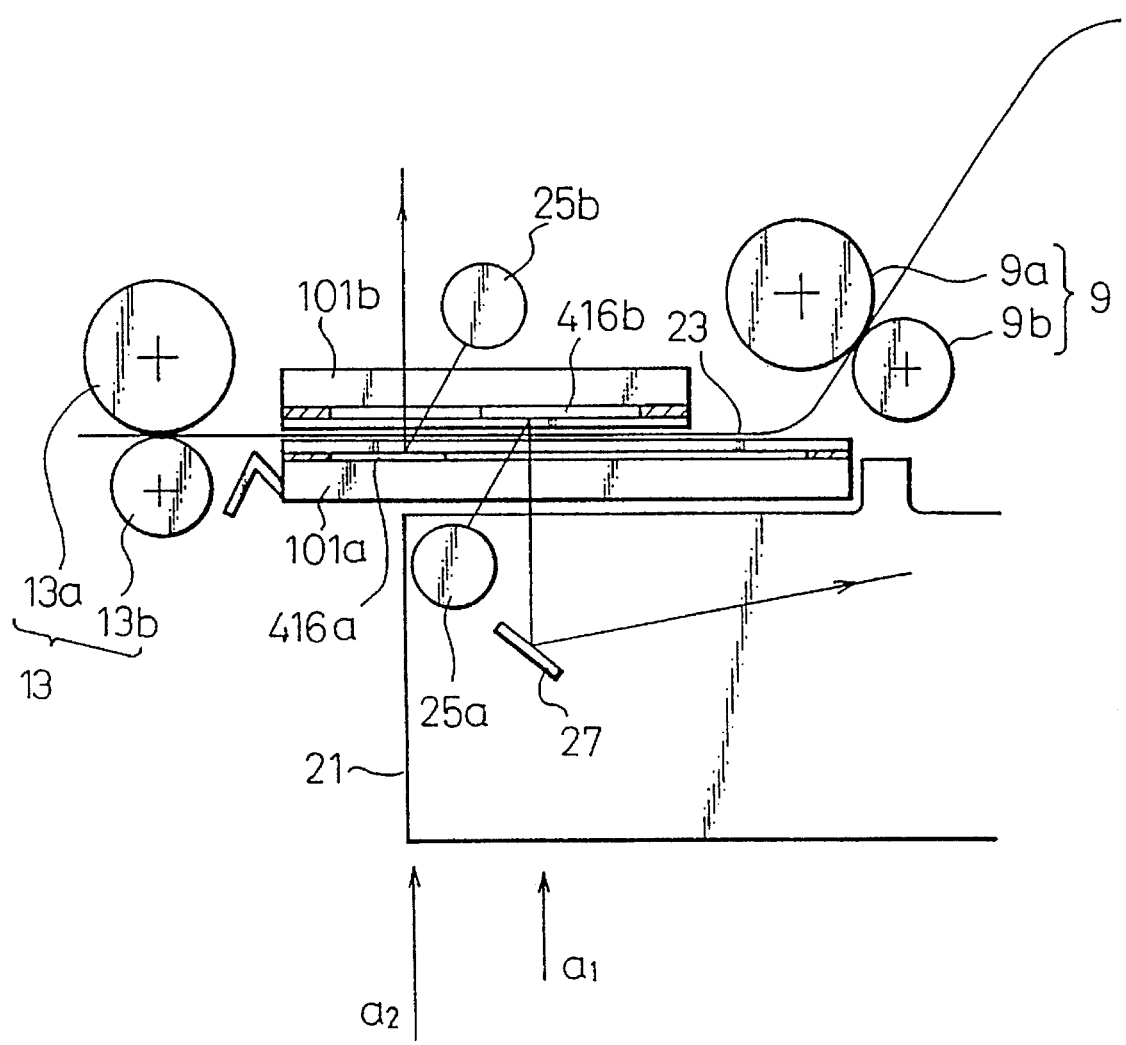
FIG. 27 is a structural view of the principle of the reading mechanism of a white reference sheet in the image reading apparatus of the present invention.
Figure 28:
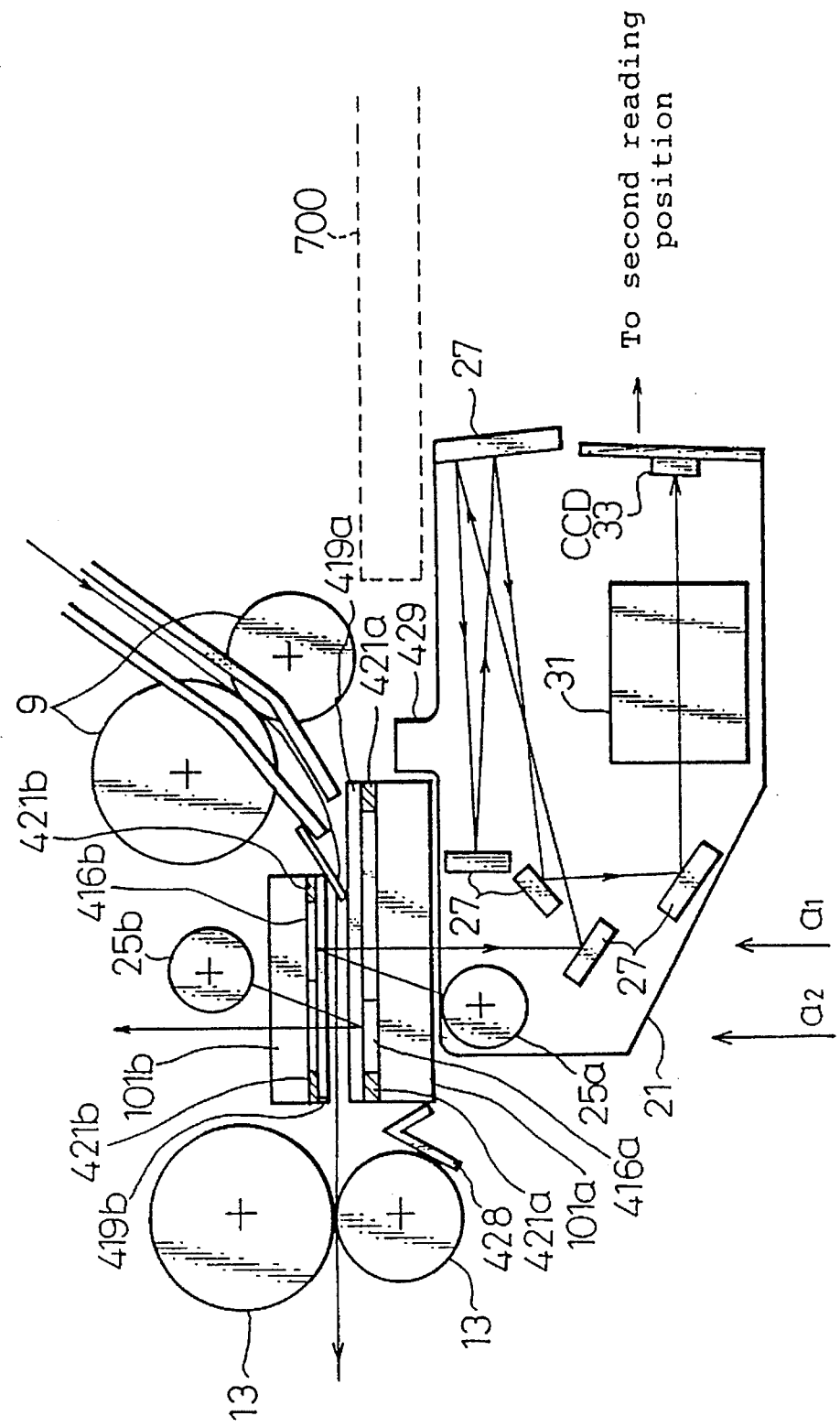
FIG. 28 is a figure showing one embodiment of the concrete structure of the apparatus shown in FIG. 27.
Figure 29:
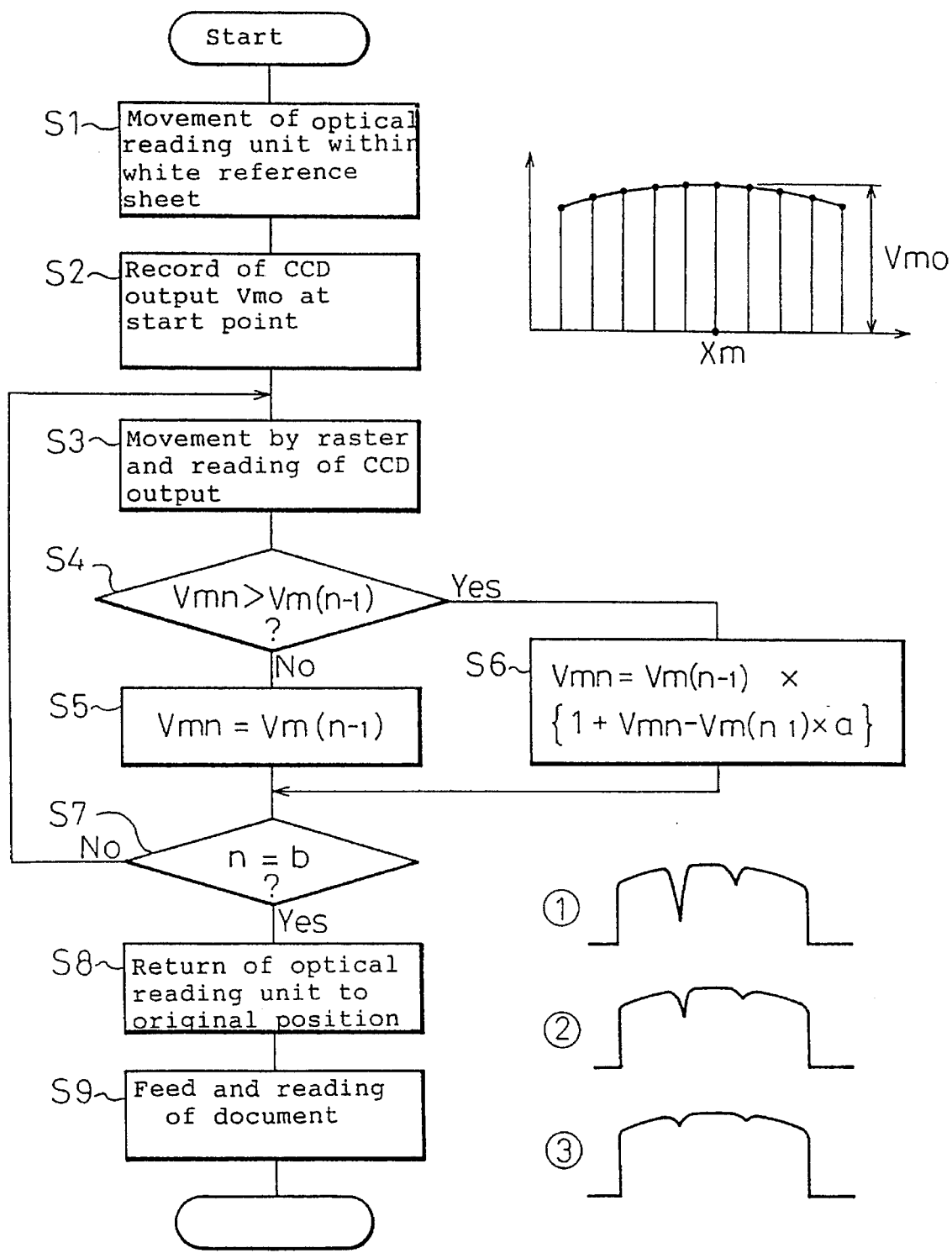
FIG. 29 is a flow chart of the white reference setting processing shown in FIG. 27.

FIGS. 27 to 29 show an embodiment applying the present invention to a composite type image reading apparatus in which the optical reading unit is fixed, and both of the automatic paper feeding and reading for reading the document by movement and the flat bed reading for performing reading by fixing the document and moving the optical reading unit are possible. A particular improvement is directed to the method of giving a white reference in the image reading apparatus.

In general, in the image reading of the document, the white reference sheet attached to the apparatus is read by the optical reading unit, whereby the absolute white level with respect to the light source is set up. In the automatic paper feeding and reading, the reading of the document is carried out by fixing the optical reading unit, but in the conventional document reading apparatus, the white reference was placed on the flat bed reading portion side, and therefore it was necessary to perform the reading of the white reference by moving the optical reading unit.

The optical reading unit moves beneath the white reference sheet before the start of the reading of the documents and reads the white reference, thereafter returns to the reading position (first reading position) of the automatic paper feeding and continuously reads the image on the surface of the document passing above.

Also, at the flat bed reading, the document is placed on the flat bed, the optical reading unit first reads the white reference beneath the white reference sheet, and thereafter proceeds beneath the flat bed (second reading position) and reads the document on the flat bed while moving.

Therefore, in the embodiment shown in FIGS. 27 to 29, in the composite type image reading apparatus of automatic paper feeding and reading and flat bed reading, to shorten the time required for the white reference reading at the automatic paper feeding and reading and to improve the through-put, a white reference is provided on the side opposite to the optical reading unit. Before the document is fed to the reading position, the reading of white reference is made possible by the optical reading unit.

FIG. 27 is a structural diagram of the principle thereof and shows only a principal part of the image reading apparatus of the two-side document reading type. Parts corresponding to those in the above-mentioned embodiments are shown by the same numerals and an overlapping explanation will be omitted.

"$a_1$" and "$a_2$" are reading positions for reading the front surface and back surface of the document, respectively.

Reference numerals 101a and 101b are platen glasses for reading the front surface and back surface of the document.

Reference numerals 416a and 416b are white reference sheets for reading the front surface and back surface of the document and are adhered to the platen glasses 101a and 101b.

The document is fed between the platen glasses 101a and 101b by the feed rollers 9 and ejected by the eject rollers 13. This document feeding passage 23 is indicated by an arrow.

Where the document is not fed, the optical reading unit 21 can read the white reference sheet 416b adhered to the platen glass 101b through the opposite platen glass 101a at the reading position "$a_1$", and similarly the optical reading unit for the back surface reading, the illustration of which is omitted, can read the white reference sheet 416a adhered to the platen glass 101a at the reading position "$a_2$".

Next, when the document is fed to the reading positions "$a_1$" and "$a_2$", the white reference sheet is hiddened in back of the document. For example, the optical reading unit 21 operates so as to read the front surface of the passing document.

In FIG. 27, during the automatic paper feeding and reading, the optical reading unit 21 can sequentially read the white reference sheet 416b and front surface of the document while being fixed at the illustrated position. During flat bed reading, after reading the white reference sheet 416b at the illustrated position, the optical reading unit 21 moves beneath a flat bed 700 (FIG. 28) on the right, the illustration of which is omitted, and performs the reading of the document on the flat bed. Note that, the flat bed is used when reading a document which cannot be stacked on the hopper 3, for example, a book.

In the conventional example, the white reference sheet was arranged at a position separate from the automatic paper feeding and reading position, but in the invention of the present application, it is provided at the automatic paper feeding and reading position, and therefore a large movement of the optical reading unit for reading the white reference is not required. Therefore, the time for the reading operation of the document can be shortened.

FIG. 28 shows the structure of a concrete embodiment of FIG. 27. In FIG. 28, 418 is a reading position of the back surface of the document; 419a and 419b are thin plate glasses for the cover; 421a and 421b are two-surface adhesion tapes; 25a and 25b are lamps for illuminating the document; 27 is a mirror; 31 is a lens; 33 is a CCD; 428 is a plate spring; and 429 is a projection.

The white reference sheets 416a and 416b are held between the platen glasses 101a and 101b and the thin plate glasses 419a and 419b respectively in a sandwiched state and retained, and the platen glasses and the thin plate glasses are adhered by the two-surface adhesion tapes 421a and 421b, respectively. Where there is no document at the reading position, the white reference sheets 416a and 416b are illuminated by the lamps 25a and 25b, respectively, and the reflection light is read by the CCD 33 inside the optical reading unit 21.

The platen glass 101a is constituted so that it can move slightly leftward (about 2 to 3 mm) and is usually pressed rightward by the plate spring 428. At the reading of the front surface of the document, the optical reading unit 21 is moved slightly (2 to 3 mm) rightward from the illustrated position. During this movement, the white reference sheet 416b is read by a plurality of rasters. The signal is sent to a white level follower circuit (usually provided in the image reading apparatus). The disturbance of the white reference level due to dust or stain deposited on the platen glass is removed to set the white reference.

At the reading of the back surface of the document, the optical reading unit 21 is moved leftward and the platen glass 101a is moved leftward (by 2 to 3 mm) against the force of the plate spring 428 by the projection 429. During this movement, the white reference sheet 416a is read by a plurality of rasters by the CCD for reading the back surface (the illustration is omitted). In the same way as that mentioned before, the influence of dust or stains on the white reference level is eliminated to set up the white reference.

A detailed explanation of the processing for setting the white reference (controller) will be made by FIG. 29.

Step S1: Control for moving the optical reading unit from the initial position of FIG. 28 is started. In the case of the front surface reading, it is moved rightward, while in the case of the back surface reading, it is moved leftward. The number of rasters of the white reference read during the movement is made b. Also, the variable n is defined as: $1 \leq n \leq b$.

S2: The CCD output $V_{m0}$ at the point of time of starting the movement is read for each bit position $X_m$ and is recorded.

S3: Movement of one raster is performed (n<n+1). The CCD output $V_{mn}$ at that time is read.

S4: The previous CCD output $V_{m(n-1)}$ and the present CCD output $V_{mn}$ are compared at each bit position $X_m$. When the former is larger, step S5 is executed, while when the latter is larger, step S6 is executed.

S5: When the previous value is larger than the present value, the present value is corrected to the previous value ($V_{mn}=V_{m(n-1)}$).

S6: When the present value is larger than the previous value, the previous value is increased exactly by a value obtained by multiplying the difference between the previous value and the present value ($V_{mn}-V_{m(n-1)}$) by a constant a (0<a<1).

$$V_{mn}=V_{m(n-1)} \times \{1+(V_{mn}- V_{m(n-1)}) \times a\}$$

S7: The processing from S3 to S7 is repeated until n becomes equal to the defined raster number b, and the operation proceeds to step S8 when n becomes equal to b.

S8: The optical reading unit is restored to the initial position shown in FIG. 28.

S9: The feeding of document is started and the image is read.

In the processing of steps of S4, S5, and S6 mentioned above, at the white reference reading of the continuous rasters, when the present value is smaller than the previous value, the present value is abandoned and the previous value is held, while when the present value is larger than the previous value, the white level is corrected to the larger one by the method of performing a correction only with a constant proportion of the increased amount.

Accordingly, as exemplified by [1], [2], and [3] at the right bottom of FIG. 29, even if the CCD output due to the dust is reduced in the raster of [1] and the disturbance of the white level occurs, if the normal white reference reading is carried out by the subsequent raster, it is possible to gradually obtain a proper white level as in [2] and [3].

The embodiment explained above is for two-side reading, and therefore white reference sheets were adhered to the front surface and back surface platen glasses, respectively, but in the case of a one-side reading apparatus etc., it is also possible to adhere the white reference sheet to an appropriate member such as a back abutment member in the vicinity of the reading position or the like.

According to this embodiment, it is not necessary to excessively increase the dimensions of the apparatus for the attachment of the white reference sheets, and an increase of the through-put can be achieved without the problem of degrading the attachment strength of the frame plate. Further, it becomes possible to effectively cope with the disturbance of the white reference due to stains of the white reference sheet surface, and therefore the quality of the reading image can be improved.

Figure 30:
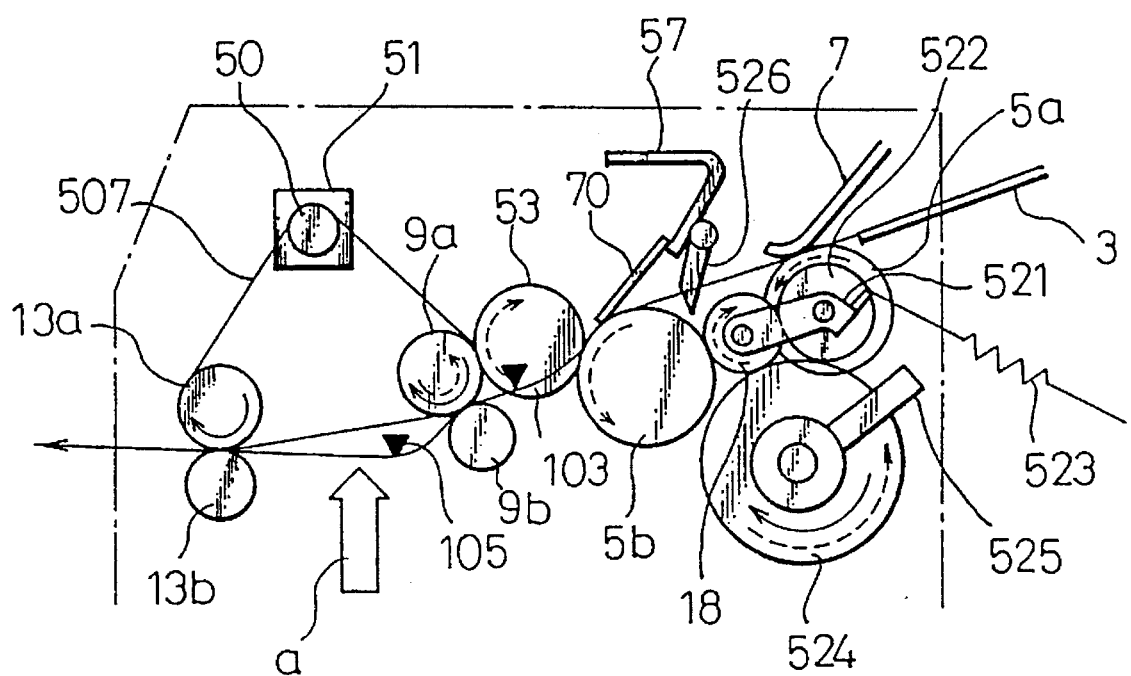
FIG. 30 is an explanatory view of the structure diagrammatically showing another paper feeding mechanism different from that in FIG. 1.

FIG. 30 is an explanatory view of the structure diagrammatically showing a modified embodiment of FIG. 1. The same parts are indicated by the same reference numerals as those in the aforesaid FIG. 1. In FIG. 30, 521 is a pick arm, which is provided on the shaft of the gear 18 so that it can swing and, at the same time, a pick roller 5a and a gear 522 are provided on the rocking end so that they can rotate. Note that, the gear 522 is engaged with the gear 18. Reference numeral 523 is a spring, provided between the rocking end of the pick arm 521 and the main body of the apparatus with tension, which is formed so as to bias the pick arm 421 in the clockwise direction. Next, 524 is a gear, which is provided so that it can pivot in engagement with the aforesaid gear 18. At the same time, an actuation arm 525 is coaxially provided and formed so that the pivoting end of this actuation arm 525 becomes able to be engaged with or disengaged from the aforesaid pick arm 521. Note that, a torque limiter (not illustrated) is attached to the shaft of the gear 524 and formed so as to limit the torque where the actuation arm 525 pivots in the counterclockwise direction and makes the pick arm 521 pivot in the counterclockwise direction to the predetermined value or less. Reference numeral 526 is a sensor, which is provided in the document conveyance passage between the pick roller 5a and the separation roller 5b in the vicinity of, for example, the gate 57. The rest of the structure is similar to that shown in FIG. 1 or FIG. 52.

An explanation will be made next of the function of the above-described structure. First, in FIG. 30, when the pulley 506 is rotated by the drive motor 51 in a direction indicated by a broken arrow, the feed roller 9a rotates in the counterclockwise direction by a belt 507 and prepares for the front edge alignment in a case where the document arrives. Simultaneously, also the pick roller 5a and the separation roller 5b rotate in the same direction, and therefore one sheet among the documents 1 (FIG. 1) stacked on the document stand 3 is fetched by the pick roller 5a, passes the separation roller 5b, and is conveyed to the feed roller 9a, where the above-mentioned front edge alignment is carried out.

The document front edge alignment time by the above-described feed roller 9 is controlled by the preliminarily set pulse number or time after the passing of the document is detected by a sensor 526, which is the same as the embodiment of FIG. 1 described before. In this case, for example, when the document is thick and cannot be fetched even by the rotation of the pick roller 5a, that is, when the document does not reach the sensor 526, the gear 524 pivots in the direction indicated by a broken arrow via the gear 18. Then, also the actuation arm 525 provided coaxially with the gear 18 pivots in the same direction, engages with the rocking end of the pick arm 521, and pivots the pick arm 521 in the counterclockwise direction against the tension of the spring 523. By the pivoting of this pick arm 521, the pick roller 5a is pressed upward with the preliminarily set torque as a limit, and therefore the pressing force against the document is increased and the document can be reliably fetched.

Next, after the completion of the fetching of the document, when the front edge alignment processing by the feed roller 9 is ended, the feed roller 9 rotates in the direction indicated by a solid arrow, so that the conveyance of the document is carried out. On the other hand, by the rotation of the feed roller 9 in the direction indicated by the solid arrow, the gear (not illustrated) provided coaxially with the pick roller 5a and separation roller 5b rotates in the reverse direction to that in FIG. 30, but the one-directional clutch is attached to these rollers as mentioned before, and therefore it does not rotate and remains in the stopped state. Then, by the rotation of the gear 18 in the counterclockwise direction, the gear 524 pivots in the direction indicated by the solid arrow, and therefore the actuation arm 525 is detached from the pick arm 521 and returns to its original position shown in for example FIG. 30.

During the rotation of the above-described pulley 50, feed rollers 9, and eject rollers 13 in the direction indicated by the solid arrow, both of the pick roller 5a and the separation roller 5b are in the stopped state. Namely, the one-directional clutch is attached to the pick roller 5a and the separation roller 5b, and therefore even if the gear 53 rotates in the direction indicated by the solid arrow, this rotation is not transferred to the pick roller 5a and the separation roller 5b. Accordingly, the subsequent document is not directly conveyed to the feed rollers 9 rotating in the direction indicated by the solid arrow.

After the rear end of the preceding document is detected by the sensor 105, the drive motor 51 rotates in reverse after an elapse of the preliminarily set pulse numbers or time and the pulley 50 and the feed roller 9 rotate in the direction indicated by a broken arrow, to complete the preparation for the front edge alignment of the next document. Simultaneously, also the pick roller 5a and the separation roller 5b rotate in the direction indicated by the broken arrow, and the next document is fetched. During this time, even if the preceding document remains in an engagement state with the eject rollers 13, the eject rollers 13 are in the stopped state, therefore the inconvenience of the preceding document being conveyed in the reverse direction does not occur.

Figure 31:
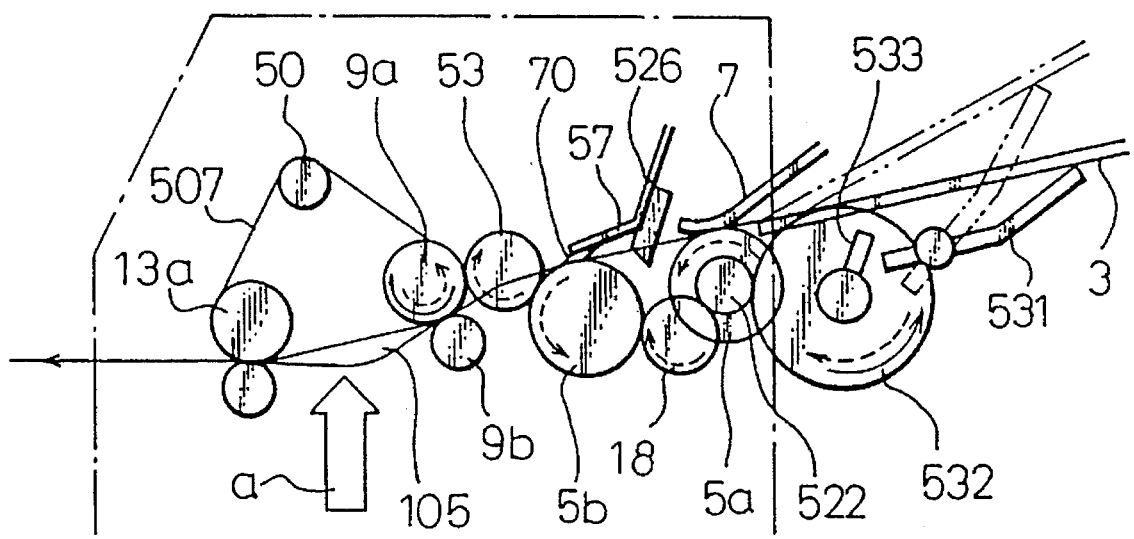
FIG. 31 is an explanatory view of the structure diagrammatically showing another embodiment from that of FIG. 30.

FIG. 31 is an explanatory view of the structure further diagrammatically showing a modified embodiment of FIG. 30, wherein the same parts are indicated by the same reference numerals as those in the aforesaid FIG. 30. In FIG. 31, the hopper 3 is formed so that it can swing about the vicinity of the pick roller 5a and can swing from the position indicated by the solid line to the position 3' indicated by for example a chain line. Reference numeral 531 is a rocking arm, provided beneath the hopper 3 so that it can swing and is formed so that the left end portion can be engaged with and disengaged from the actuation arm of 533 mentioned later and the right end portion can be engaged with and disengaged from the bottom portion of the hopper 3, respectively. Next, 532 is a gear, which gear 522 is provided so that it can pivot in engagement. At the same time, the actuation arm 533 is coaxially provided. The pivoting end of this actuation arm 533 can be engaged with or disengaged from the left end portion of the aforesaid rocking arm 531. Note that, a torque limiter (not illustrated) is attached to the shaft of the gear 532, and the actuation arm 533 pivots in the clockwise direction, to restrict the torque when the rocking arm 531 is pivoted in the counterclockwise direction by a predetermined value or less. The rest of the structure is similar to that of FIG. 30.

Figure 32A:
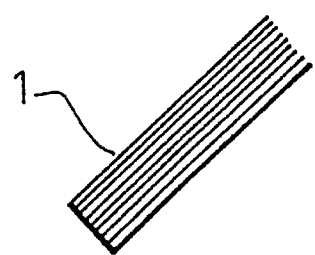
FIGS. 32A and 32B are side views showing the states before and after the front edge alignment operation of a stacked large number of documents, respectively.
Figure 32B:
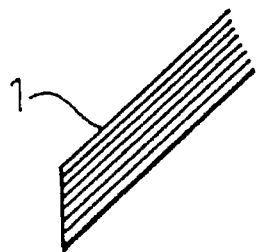

In the above-described structure, the document front edge alignment function and the processing function thereafter are similar to those in the embodiment of FIG. 1 and the embodiment of FIG. 30 described before. Therefore, explanations of these are omitted. An explanation will be made of the fetching function of the document. First, for example, when a document is not fetched even by the rotation of the pick roller 5a, that is, when no document reaches the sensor 526, the gear 532 pivots in the direction indicated by the broken arrow via the gear 522. Then, also the actuation arm 533 provided coaxially with the gear 532 pivots in the same direction, engages with the left end portion of the rocking arm 531, makes the rocking arm 531 pivot in the counterclockwise direction, and swings the same to the position indicated by the chain line. Since the document stand 3 swings to the position 3' indicated by the chain line by the above-described rocking of the rocking arm 531, the inclination angle of the document with respect to the horizontal plane is increased, and the sliding function of the document into the pick roller 5a is assisted, so that the state of 32B is formed and thus the fetching of the document becomes smooth. Note that, FIG. 32A shows a state where the front edge alignment of the paper 1 is not carried out, and 32B indicates a state where the front edge alignment is carried out. Particularly, in the case of a bottom take-out type paper feeding system, when a large number of sheets of document 1 as shown in FIG. 32B is set on the hopper 3, so as to smoothly and reliably perform the fetching of the documents into the separation roller, as shown in FIG. 32B, a preoperation must be carried out so that the front end of the document 1 forms a knife edge.

Next, after the completion of the fetching of the documents, when the front edge alignment processing by the feed roller 9 is ended, the feed roller 9 rotates in the direction indicated by the solid arrow, and the conveyance of the document is carried out. On the other hand, the gear 532 pivots in the direction indicated by the solid arrow via a middle gear train with which the gear 532 is engaged, and therefore the actuation arm 533 is detached from the rocking arm 531 and returns to its original position as shown in for example FIG. 31. In this case, the pick roller 5a and the separation roller 5b do not rotate, but remain in the stopped state, in the same way as in the aforesaid embodiment.

Figure 33:
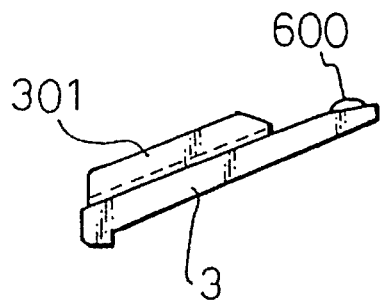
FIG. 33 is a side view showing an embodiment in which the projections are provided in the hopper.

In the bottom take-out type automatic paper feeding mechanism as mentioned above, every time one sheet of the lowermost documents 1 is taken out of the hopper (shooter) 3, the document 1 slides and rubs on the upper surface of the hopper, and therefore static electricity is apt to be generated. The generation of the static electricity is particularly conspicuous in a low humidity environment. Therefore, frequently, the document 1 is adhered to the hopper 3 by the static electricity and a picking error of the document 1 is caused. Also, as the hopper capacity becomes larger, picking error occurs more frequently. So as to solve this, as shown in FIG. 33, preferably projections 600 are provided on the upper surface of the hopper 3 in a direction orthogonal to the conveyance direction of the document (FIG. 40) or on both sides of the conveyance direction of the document. The projections 600 are appropriately distributed on the upper surface of the hopper 3 at appropriate intervals. The projections 600 preferably exhibit a semi-spherical shape to reduce the contact surface area with the paper 1 to as small as possible. Thus, there is exhibited a state where several portions of the paper 1 float with respect to the upper surface of the hopper 3 by the projections 600, not a state of close contact of the entire surface, and the problem of the picking errors accompanying the static electricity is greatly reduced.

Figure 19:
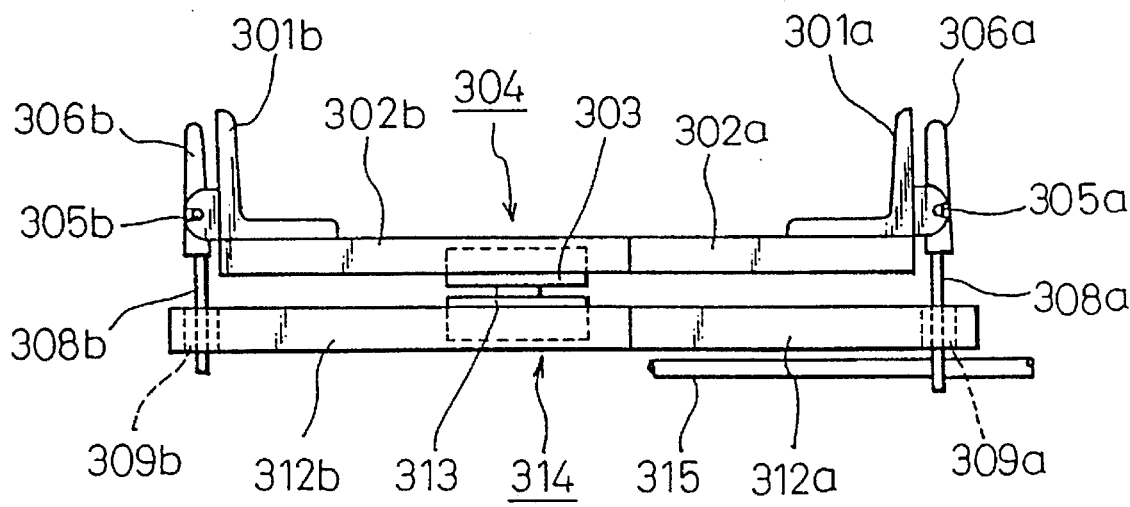
FIG. 19 is a side view of one embodiment of the paper guide according to the present invention.
Figure 20:
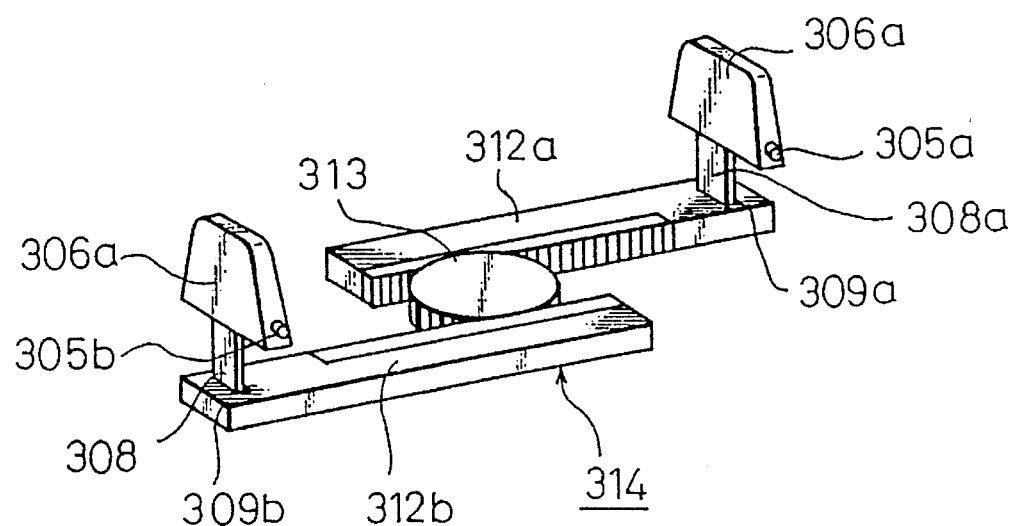
FIG. 20 is a perspective view showing the symmetrical moving mechanism shown in FIG. 19 taking as an example the second symmetrical moving mechanism.
Figure 21:
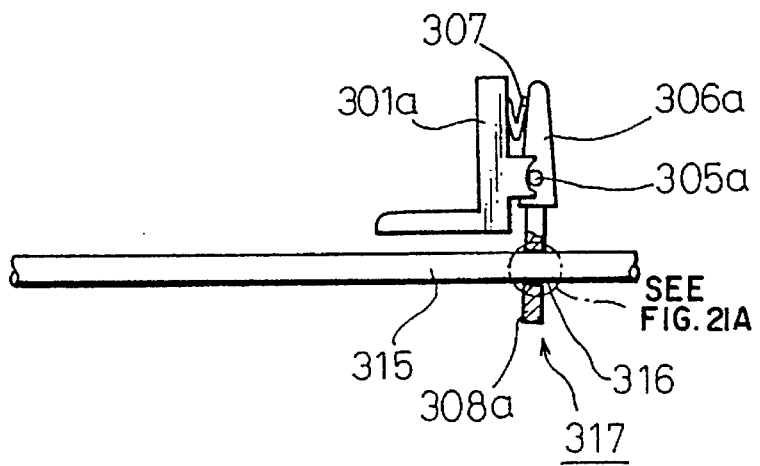
FIG. 21 is a side view of the locking mechanism part shown in FIG. 19.
Figure 21A:
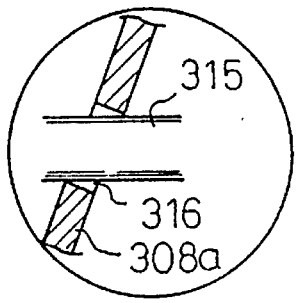
Figure 22:
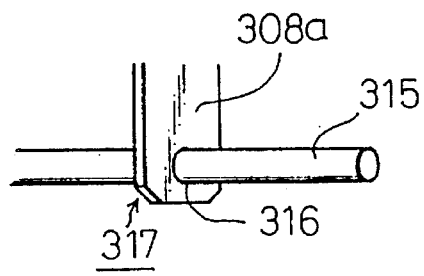
FIG. 22 is an enlarged perspective view of a principal part of FIG. 21.
Figure 23:
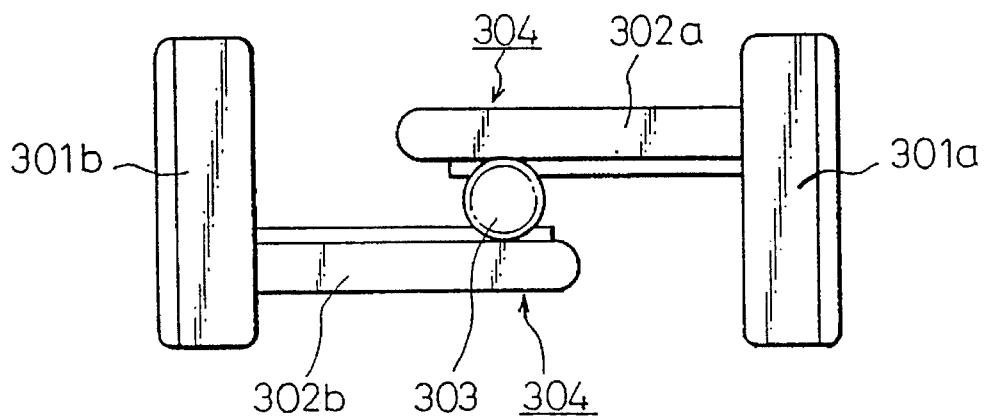
FIG. 23 is a plan view showing the first symmetrical movement mechanism of the paper guide.
Figure 34:
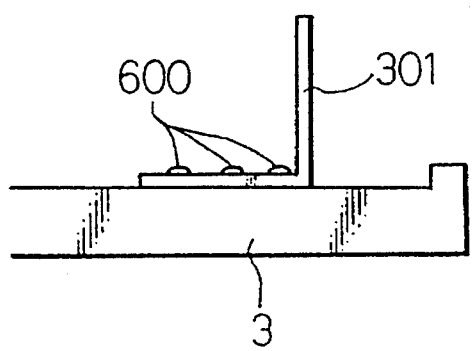
FIG. 34 is a side view showing an embodiment in which the projections are provided in the paper feed guide.

It is also possible to form the projections 600 on the guides 301 (301a and 301b) explained referring to FIG. 19, as shown in FIG. 34.

Figure 35:
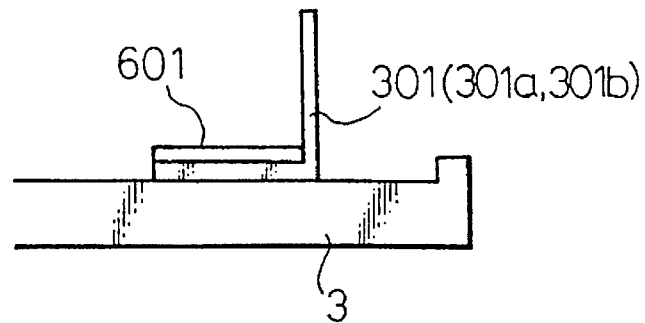
FIG. 35 is a figure showing an embodiment in which a sheet material having a charge train close to that of the paper guide is adhered to the guide.

Alternatively, in place of the provision of the projections 600, it is also possible to adhere a material having a quality close to that of the document 1 from the viewpoint of the train of the electric charges, that is a member (for example sheet) having a quality is resistant to the generation of static electricity between the same and the document 1 to the upper surface of the hopper 3 or the upper surface of the guides 301 (301a, 301b) as shown in FIG. 35. Alternatively, it is also possible to form the hopper 3 and the guides 301 per se by such a material. The material is appropriately selected by the material of the document 1. Where the document 1 is paper, an aluminum-coated sheet, a sheet made of cork, etc. are adaptable as ones having a close electric charge train.

Finally, an explanation will be made of various types of correction (magnification correction in the sub-scanning direction and offset correction) executed in the present invention for improvement of the quality of the read image.

First, an explanation will be made of the magnification correction in the sub-scanning direction.

Initial correction

Figure 36:
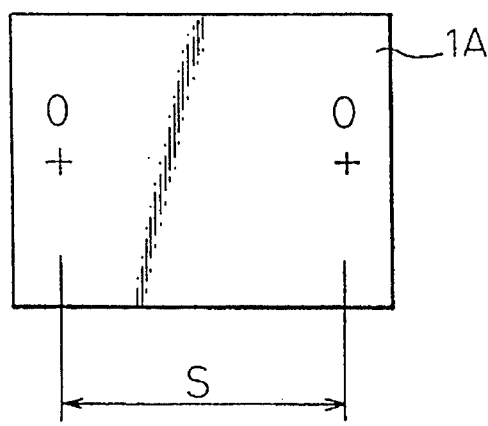
FIG. 36 is a front view showing a reference sheet for performing initial correction.
Figure 37:
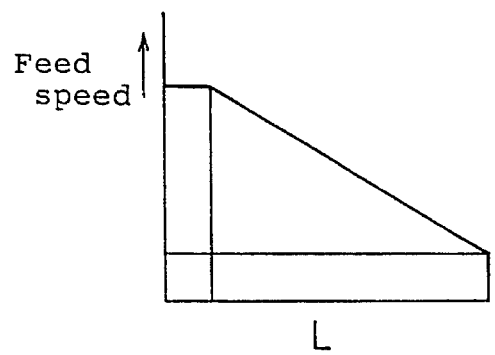
FIG. 37 is a graph showing the relationship between the length of the paper and the paper feeding speed.

A reference medium (document) 1A as shown in FIG. 36 is prepared. The correct dimension S (unit: mm) of the reference medium 1A between reference points O has been preliminarily measured. This reference medium 1A is applied to the image reading apparatus of the present invention to detect the number of pulses P corresponding to the distance S. The unit amount of paper feed v per pulse is learned, then the amount of deviation peculiar to the related image reading apparatus (due to the variation of diameter of various types of rollers and inter-roller distance etc.) is detected from the following equation:

$$u = A/v$$

wherein, u is the number of pulses in a calculation necessary for moving the distance S.

Accordingly, when it is assumed that the set speed (design value) of the motor (for example, stepping motor) 51 is M1, the motor speed M2 which should be corrected is obtained by:

$$M2 = (P/u) \times M1$$

By this, the initial correction of the motor 51 can be carried out.

Temperature correction

The change of the feed roller diameter by the ambient temperature and the change of the feeding force/back load are corrected as follows:

Note that, the feeding force/back load means the balance between the force in the direction of feeding the documents by the feed rollers and the friction resistance by the separation pad 7.

The temperature sensor TS (FIG. 1) measuring the ambient temperature is provided for example in the vicinity of the shafts of the feed rollers 9. From the measurement value $n_1$ of the temperature sensor TS, according to the following equation, the speed correction value M3 of the stepping motor 51 is found:

$$M3 = (1 - \Delta m (n_1 - n_0)) \times M1$$

wherein, $\Delta m$ is the correction value per unit temperature: $n_0$ is the reference temperature (for example, ordinary temperature: 25° C.); and M1 is the set speed (design value) of the stepping motor 51.

In this way, if the temperature correction can be carried out, it is not necessary to use an expensive metal roller in comparison with the prior art, which does not perform the temperature correction and accordingly must use a feed roller made of metal having a small thermal expansion coefficient.

Size correction

The feeding speed of paper having a long length L in the paper feeding direction generally tends to be slower in comparison with paper having a short length (FIG. 32). This is because, when the length L of the paper is long, the time from when the front end of the paper 1 passes the separation pad 7 and the rear end thereof completely passes becomes relatively long, and therefore the time of receiving the frictional resistance by the separation pad 7 is prolonged by chat amount.

Therefore, desirably the length L of the paper is detected and the motor speed is changed in accordance with this. It is also possible to directly detect the length L of the paper, but there is a one-to-one correspondence of the lengths of the paper with standard sizes (A4, B4, B5, etc.), and therefore an existing size sensor is utilized as it is in the present invention.

Figure 38:
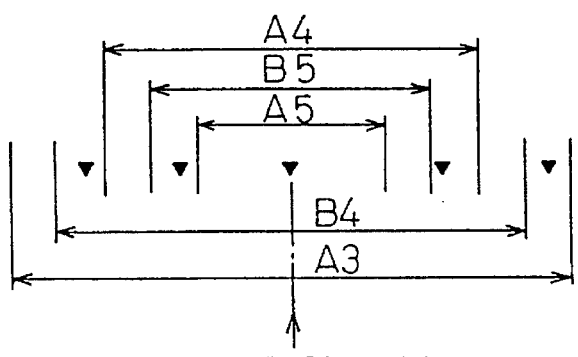
FIG. 38 is a figure showing an example of arrangement of the size sensor of the paper.

Namely, generally a paper size sensor is provided in the image reading apparatus as shown in FIG. 38. As this sensor, generally a contact switch or an optical sensor is used. The switch or sensor is placed at the portion indicated by the inverted triangle in FIG. 38. The paper size can be detected by the combination of ON and OFF signals thereof.

The motor speed is changed in accordance with the paper size detected in this way. The relationship between the correction value of the motor speed and the paper size may be preliminarily stored in the map of the memory of the controller.

Figure 39:
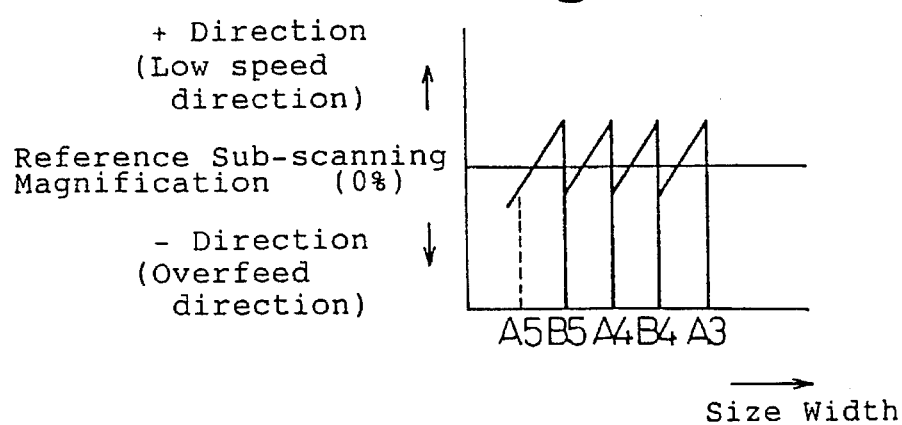
FIG. 39 is a graph showing the correction state of the sub-scanning magnification in accordance with the paper size.

FIG. 39 shows the situation of that control. It will be understood that the motor speed, that is, the sub-scanning magnification, is corrected in accordance with the paper size with respect to the reference sub-scanning magnification (0%).

Offset correction (main scanning direction)

There is a possibility that the reading position by the reading unit will deviate in the main scanning direction (scanning direction of the beam) due to the thermal expansion and shrinkage of the document cover. This deviation can also be corrected by the following equation in accordance with the detection temperature $n_1$.

$$M4 = \frac{\Delta \alpha (n_1 - n_0)}{g}$$

Note, M4 denotes the offset correction value: $\Delta \alpha$ denotes the amount of expansion and shrinkage per unit temperature; and g denotes the basic resolution (dpi) of the related apparatus, respectively.

Figure 40:
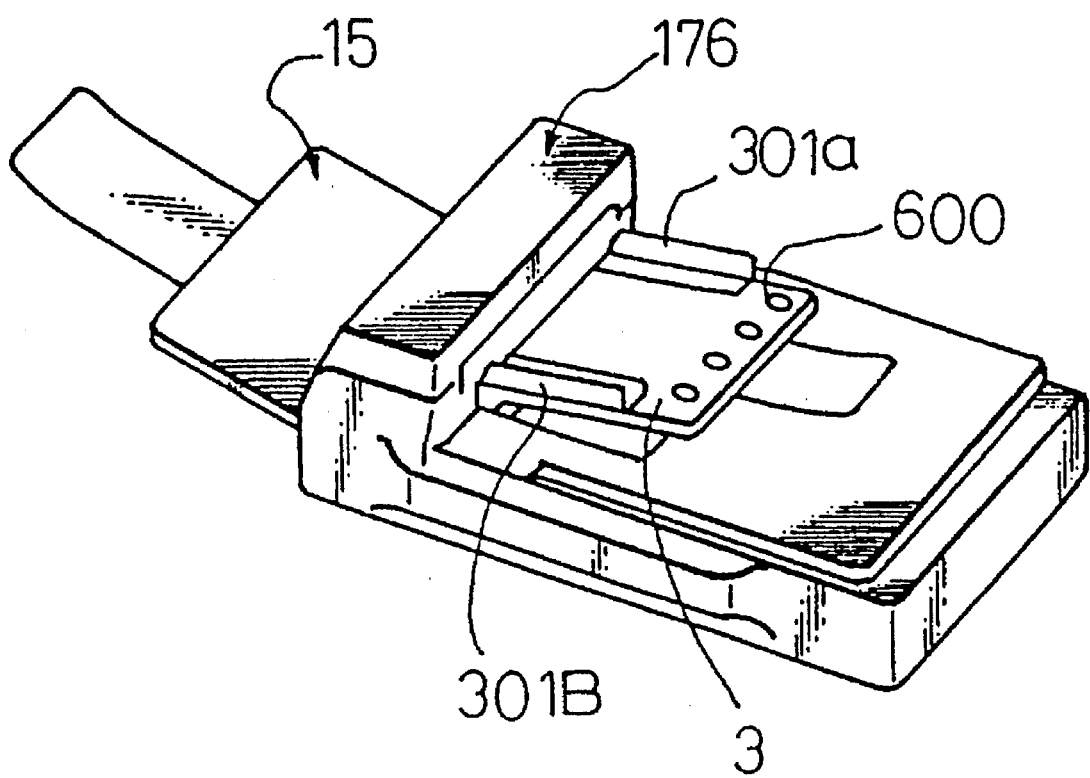
FIG. 40 is a perspective view schematically showing the overall outer appearance of the image reading apparatus according to the present invention.
Figure 41:
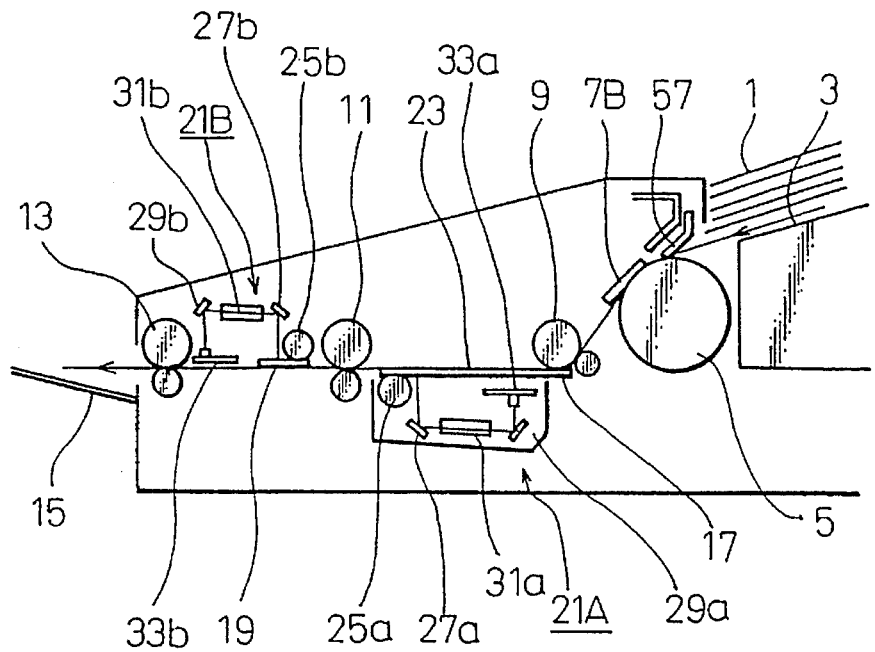
FIG. 41 is a diagrammatical side view showing one example of the conventional two-side reading construction.
Figure 42:
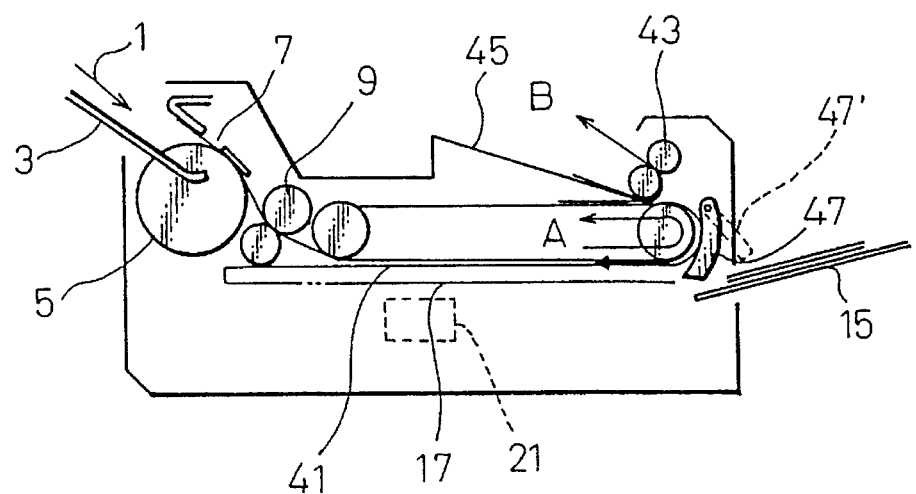
FIG. 42 is a diagrammatical side view showing another example of the conventional two-side reading construction.
Figure 43:
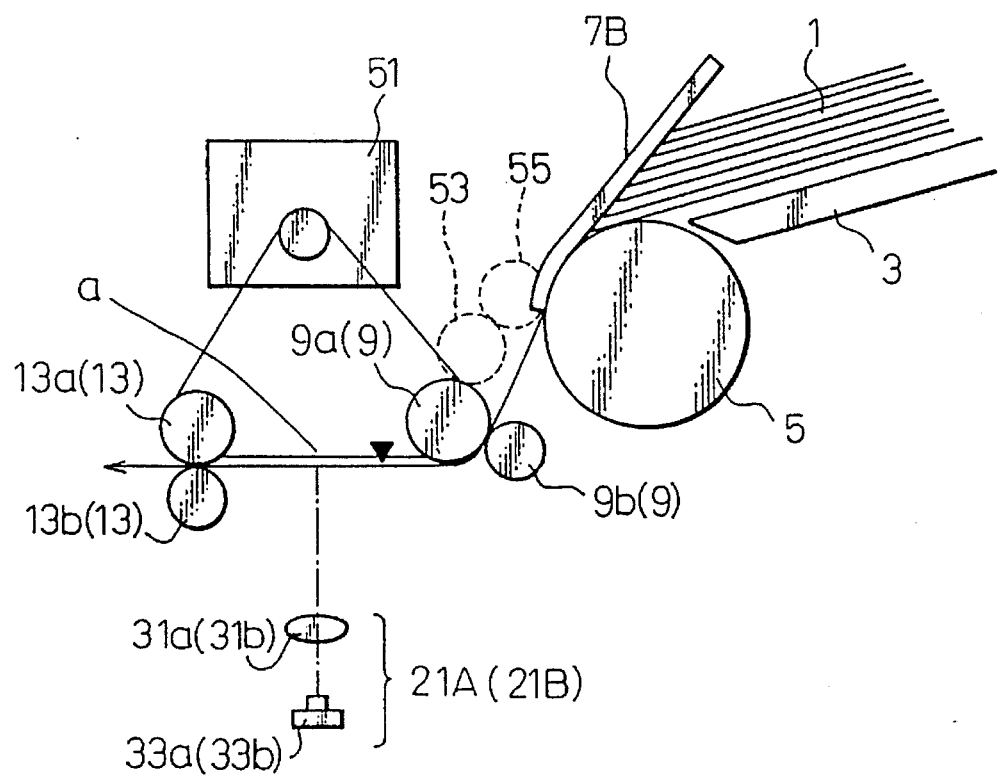
FIG. 43 is a view explaining the conventional paper feeding mechanism.
Figure 44:
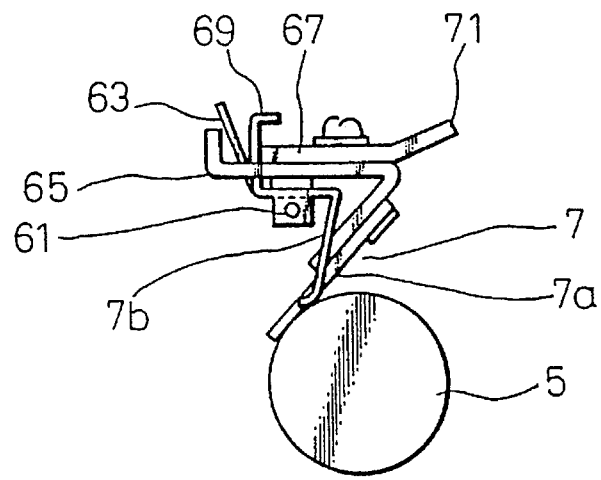
FIG. 44 and FIG. 45 are a side view and a plan view of a conventional paper separation spring.
Figure 45:
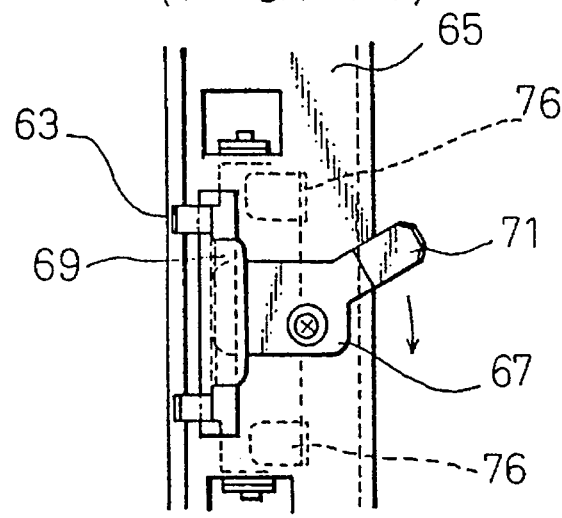
Figure 46:
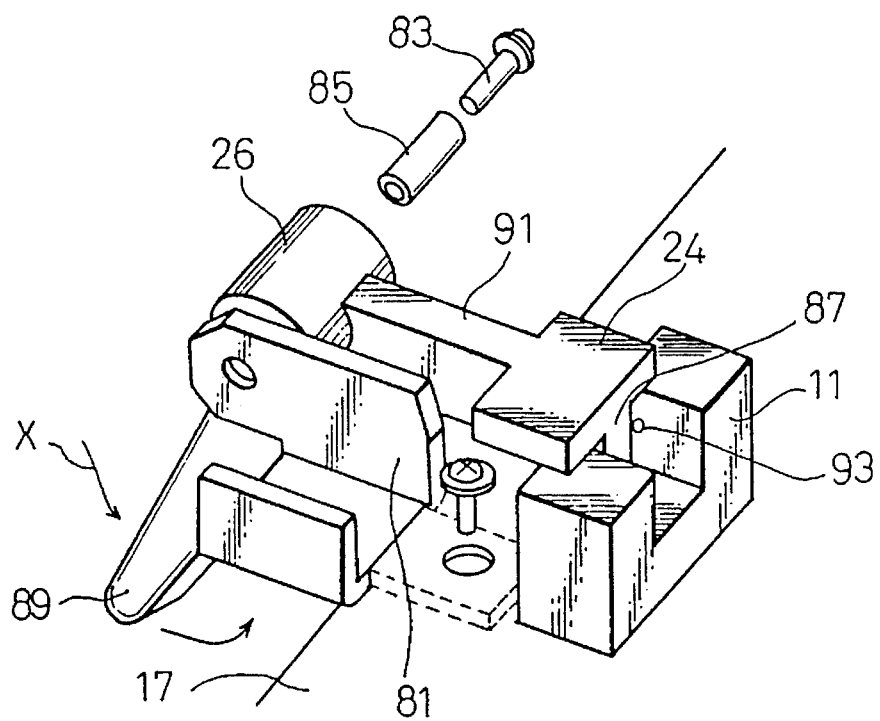
FIG. 46 is a perspective view of the conventional paper width detection sensor.
Figure 47:
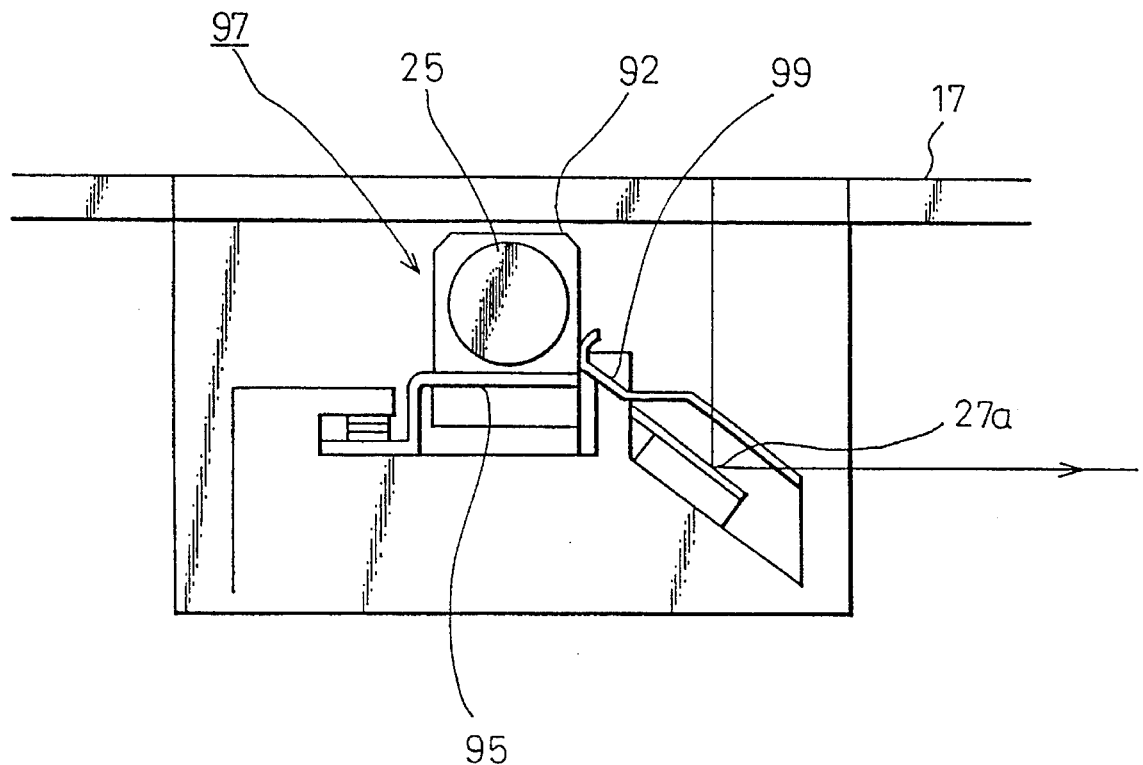
FIG. 47 is a side view showing a conventional light source lamp unit.

FIG. 40 shows the schematic outer appearance of the image reading apparatus according to the present invention for reference.

Finally, the basic concept concerning the improvement of the portions mentioned above can be applied to both of the one-side reading and two-side reading.

CAPABILITY OF EXPLOITATION IN INDUSTRY

The present invention can be applied to all apparatuses reading information using an image reading apparatus such as a facsimile or image scanner.

We claim:

1. An image reading apparatus having a bottom take-out type automatic paper feeding apparatus which sequentially takes out sheet-like paper stacked on a hopper one by one from the lowermost sheet by separation by paper feed rollers arranged at the front edge side thereof and a separation member coming into contact with said paper feed rollers, said paper feed rollers being constituted by a first roller positioned on the upstream side of a paper feeding direction and a second roller positioned on the downstream side; the apparatus further having a fixed gate plate forming a slit having a predetermined width allowing the passing of a predetermined number of sheets of paper therethrough in a space between the gate plate and the first roller provided at the first roller so as to face the first roller.

2. An image reading apparatus as set forth in claim 1, wherein said gate plate is inclined in a paper feeding direction.

3. An image reading apparatus as set forth in claim 1, wherein said separation member is constituted by a separation pad coming into surface-contact with the circumferential surface of the second roller.

4. An image reading apparatus as set forth in claim 2, wherein the inclination angle of said gate plate is variable.

5. An image reading apparatus comprising a bottom take-out type automatic paper feeding apparatus which sequentially takes out sheet-like paper stacked on a hopper one by one from the lowermost sheet by separation by paper feed rollers arranged at the front edge side thereof and a separation member coming into contact with said paper feed rollers, said paper feed rollers being constituted by a first roller positioned on the upstream side of a paper feeding direction and a second roller positioned on the downstream side; a gate plate variably inclined in a paper feeding direction and forming a slit having a predetermined width allowing the passing of a predetermined number of sheets of paper therethrough in a space between the gate plate and the first roller provided at the first roller so as to face the first roller; an empty sensor which detects whether or not paper exists on the hopper; a first paper feeding detection sensor detecting the existence or nonexistence of paper between said first roller and second roller; and a gate opening and closing motor moving the gate plate in inclination; wherein the inclination angle of the gate plate becomes small when the empty sensor detects the absence of the paper and the inclination angle is increased when the first paper feeding detection sensor does not detect paper after the empty sensor detects the existence of the paper and a predetermined time elapses from the starting of rotation of the first roller.

6. An image reading apparatus as set forth in claim 1, wherein the first roller is provided in a pick arm formed so that it can swing and is formed so that the pressing force against the document becomes variable; an actuation arm formed so that it can pivot selectively in association with said first roller is provided so that it can be engaged with or disengaged from said pick arm; and said pick arm is rocked by the selective pivoting of this actuation arm, whereby the pressing force of the first roller against the document is increased.

7. An image reading apparatus comprising a bottom take-out type automatic paper feeding apparatus which sequentially takes out sheet-like paper stacked on a hopper one by one from the lowermost sheet by separation by paper feed rollers arranged at the front edge side thereof and a separation member coming into contact with said paper feed rollers, said paper feed rollers being constituted by a first roller positioned on the upstream side of a paper feeding direction and a second roller positioned on the downstream side; a gate plate forming a slit having a predetermined width allowing the passing of a predetermined number of sheets of paper therethrough in a space between the gate plate and the first roller provided at the first roller so as to face the first roller; a document stand constituting the hopper formed so that it can swing about the vicinity of the first roller; an actuation arm formed so that it can pivot selectively in association with said first roller provided on said document stand directly or via another rocking arm so that it can be engaged therewith or disengaged therefrom; wherein said document stand is rocked by the selective pivoting of said actuation arm, whereby the inclination angle with respect to the horizontal plane of the document is increased.

* * * * *